United States Patent
Teixeira et al.

(10) Patent No.: US 6,850,943 B2
(45) Date of Patent: Feb. 1, 2005

(54) SECURITY SYSTEM AND METHODOLOGY FOR PROVIDING INDIRECT ACCESS CONTROL

(75) Inventors: Steven L. Teixeira, Palo Alto, CA (US); Christopher Carr, San Francisco, CA (US)

(73) Assignee: Check Point Software Technologies, Inc., Redwood City, CA (US)

( * ) Notice: Subject to any disclaimer, the term of this patent is extended or adjusted under 35 U.S.C. 154(b) by 0 days.

(21) Appl. No.: 10/249,803

(22) Filed: May 8, 2003

(65) Prior Publication Data

US 2004/0078591 A1 Apr. 22, 2004

Related U.S. Application Data

(60) Provisional application No. 60/419,798, filed on Oct. 18, 2002.

(51) Int. Cl.$^7$ ............................................... G06F 17/30
(52) U.S. Cl. ......................................... 707/10; 709/219
(58) Field of Search .......................... 707/10, 102, 100, 707/103 R, 4; 709/219, 201, 203, 207, 217, 225, 227, 228, 231, 236; 717/101, 102, 108, 126; 718/101; 713/201; 714/38, 48, 49; 345/764; 706/50

(56) References Cited

U.S. PATENT DOCUMENTS

| 4,914,586 A | 4/1990 | Swinehart et al. ........... 707/101 |
| 5,172,227 A | 12/1992 | Tsai et al. .................... 358/133 |
| 5,412,427 A | 5/1995 | Rabbani et al. .............. 348/394 |
| 5,475,817 A | 12/1995 | Waldo et al. ................ 709/316 |
| 5,586,260 A | 12/1996 | Hu .............................. 713/201 |
| 5,623,601 A | 4/1997 | Vu ............................... 713/201 |
| 5,652,621 A | 7/1997 | Adams, Jr. et al. .......... 348/272 |
| 5,682,152 A | 10/1997 | Wang et al. ................... 341/50 |
| 5,745,701 A | 4/1998 | Nguyen-Thai et al. ...... 709/249 |
| 5,754,227 A | 5/1998 | Fukuoka ...................... 348/232 |
| 5,764,887 A | 6/1998 | Kells et al. .................. 713/200 |
| 5,798,794 A | 8/1998 | Takahashi .................... 348/398 |
| 5,815,574 A | 9/1998 | Fortinsky ..................... 713/153 |
| 5,818,525 A | 10/1998 | Elabd .......................... 348/268 |
| 5,828,833 A | 10/1998 | Belville et al. .............. 713/201 |
| 5,832,211 A | 11/1998 | Blakley et al. .............. 713/202 |
| 5,838,903 A | 11/1998 | Blakely et al. .............. 713/202 |

(List continued on next page.)

OTHER PUBLICATIONS http://home.no.net/svgub/emner/dcomcnfg_side 1, Using Dcomcnfg, May 22–2001, no publisher, pp. 1–5.*
http://www.software.rockwell.com, Security Server, Dec. 2000, Rockwell Software Products. pp. 1–3.*
http://www.sei.cmu.edu/str/descriptions/com, Component Object Model (COM), DCOM and related capabilities, 1997–3–2001, pp. 1–11.*

*Primary Examiner*—Diane D. Mizrahi
(74) *Attorney, Agent, or Firm*—John A. Smart

(57) ABSTRACT

A system providing methods for indirect access control is described. When an attempt to access a network by a first application is detected, a determination is made as to whether at least one other application is attempting indirect network access through the first application. If at least one other application is determined to be attempting indirect network access, each such other application is evaluated to determine if it is approved for network access. If each such other application is approved for network access, access to the network is permitted. Otherwise, access to the network is denied.

42 Claims, 11 Drawing Sheets

U.S. PATENT DOCUMENTS

| | | | |
|---|---|---|---|
| 5,848,193 A | 12/1998 | Garcia | 382/232 |
| 5,857,191 A | 1/1999 | Blackwell et al. | 707/10 |
| 5,864,665 A | 1/1999 | Tran | 713/201 |
| 5,875,296 A | 2/1999 | Shi et al. | 713/202 |
| 5,881,230 A | 3/1999 | Christensen et al. | 709/203 |
| 5,907,610 A | 5/1999 | Onweller | 379/242 |
| 5,913,088 A | 6/1999 | Moghadam et al. | 396/311 |
| 5,917,542 A | 6/1999 | Moghadam et al. | 348/207 |
| 5,926,105 A | 7/1999 | Wakamatsu | 370/401 |
| 5,968,176 A | 10/1999 | Nessett et al. | 713/201 |
| 5,983,350 A | 11/1999 | Minear et al. | 713/201 |
| 5,987,611 A | 11/1999 | Freund | 713/201 |
| 5,996,077 A | 11/1999 | Williams | 713/201 |
| 6,008,847 A | 12/1999 | Bauchspies | 348/391 |
| 6,028,807 A | 2/2000 | Awsienko | 365/230.02 |
| 6,064,437 A | 5/2000 | Phan et al. | 348/446 |
| 6,091,777 A | 7/2000 | Guetz et al. | 375/240 |
| 6,098,173 A | 8/2000 | Elgressy et al. | 713/201 |
| 6,125,201 A | 9/2000 | Zador | 382/166 |
| 6,134,327 A | 10/2000 | Van Oorschot | 380/30 |
| 6,154,493 A | 11/2000 | Acharya et al. | 375/240.19 |
| 6,158,010 A | 12/2000 | Moriconi et al. | 713/201 |
| 6,167,438 A | 12/2000 | Yates et al. | 709/216 |
| 6,212,558 B1 | 4/2001 | Antur et al. | 709/221 |
| 6,243,420 B1 | 6/2001 | Mitchell et al. | 375/240.18 |
| 6,247,062 B1 | 6/2001 | Sarkar | 709/245 |
| 6,249,820 B1 | 6/2001 | Dobbins et al. | 709/238 |
| 6,269,099 B1 | 7/2001 | Borella et al. | 370/389 |
| 6,304,973 B1 | 10/2001 | Williams | 713/201 |
| 6,321,334 B1 | 11/2001 | Jerger et al. | 713/200 |
| 6,330,562 B1 | 12/2001 | Boden et al. | 707/10 |
| 6,345,361 B1 | 2/2002 | Jerger et al. | 713/200 |
| 6,351,816 B1 | 2/2002 | Mueller et al. | 713/201 |
| 6,356,929 B1 | 3/2002 | Gall et al. | 709/201 |
| 6,393,474 B1 | 5/2002 | Eichert et al. | 709/223 |
| 6,393,484 B1 | 5/2002 | Massarani | 709/227 |
| 6,438,612 B1 | 8/2002 | Ylonen et al. | 709/249 |
| 6,449,723 B1 | 9/2002 | Elgressy et al. | 713/201 |
| 6,453,419 B1 | 9/2002 | Flint et al. | 713/201 |
| 6,466,932 B1 | 10/2002 | Dennis et al. | 707/3 |
| 6,473,800 B1 | 10/2002 | Jerger et al. | 709/226 |
| 6,480,962 B1 | 11/2002 | Touboul | 713/200 |
| 6,484,261 B1 | 11/2002 | Wiegel | 713/201 |
| 6,490,679 B1 | 12/2002 | Tumblin et al. | 713/155 |
| 6,499,110 B1 | 12/2002 | Moses et al. | 713/201 |
| 6,510,513 B1 | 1/2003 | Danieli | 713/156 |
| 6,526,513 B1 | 2/2003 | Shrader et al. | 713/200 |
| 6,539,483 B1 | 3/2003 | Harrison et al. | 713/201 |
| 6,553,498 B1 | 4/2003 | Elgressy et al. | 713/201 |
| 6,598,057 B1 | 7/2003 | Synnestvedt et al. | 370/352 |
| 6,606,708 B1 | 8/2003 | Devine et al. | 713/201 |
| 6,609,128 B1 * | 8/2003 | Underwood | 707/10 |
| 6,615,253 B1 * | 9/2003 | Bowman-Amuah | 709/219 |
| 6,643,776 B1 | 11/2003 | Boden et al. | 709/224 |
| 2002/0072986 A1 * | 6/2002 | Aram | 705/26 |
| 2003/0055962 A1 | 3/2003 | Freund et al. | 709/225 |
| 2003/0177389 A1 | 9/2003 | Albert et al. | 713/201 |

* cited by examiner

SECURITY SYSTEM AND METHODOLOGY FOR PROVIDING INDIRECT ACCESS CONTROL

CROSS REFERENCE TO RELATED APPLICATIONS

The present application is related to and claims the benefit of priority of the following commonly-owned provisional application(s): application Ser. No. 60/419,798, filed Oct. 18, 2002, entitled "Security System And Methodology For Providing Indirect Access Control", of which the present application is a non-provisional application thereof. The present application is related to the following commonly-owned application(s): application Ser. No. 09/944,057, filed Aug. 30, 2001, entitled "System Providing Internet Access Management with Router-based Policy Enforcement"; application Ser. No. 10/159,820, filed May 31, 2002, entitled "System and Methodology for Security Policy Arbitration". The disclosures of each of the foregoing applications are hereby incorporated by reference in their entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

This application includes a transmittal under 37 C.F.R. Sec. 1.52(e) of a Computer Program Listing Appendix. The Appendix comprises text files that are IBM-PC machine and Microsoft Windows Operating System compatible. The files include the following list of files.

Object Description: patent.cpp.txt, created Apr. 25, 2003 9:59 AM, 22 KB; Object ID: File 1; Object Contents: Source code.

All of the material disclosed in the Computer Program Listing Appendix can be found at the U.S. Patent and Trademark Office archives and is hereby incorporated by reference into the present application.

BACKGROUND OF INVENTION

1. Field of the Invention

The present invention relates generally to systems and methods for maintaining security of computer systems connected to one or more networks (Local Area Networks or Wide Area Networks) and, more particularly, to a system and methodology for providing indirect access control.

2. Description of the Background Art

The first computers were largely stand-alone units with no direct connection to other computers or computer networks. Data exchanges between computers were mainly accomplished by exchanging magnetic or optical media such as floppy disks. Over time, more and more computers were connected to each other using Local Area Networks or "LANs". In both cases, maintaining security and controlling what information a computer user could access was relatively simple because the overall computing environment was limited and clearly defined.

In traditional computing networks, a desktop computer largely remained in a fixed location and was physically connected to a single local network (e.g., via Ethernet). More recently, however, an increasingly large number of business and individual users are using portable computing devices, such as laptop computers, that are moved frequently and that connect into more than one network. For example, many users now have laptop computers that can be connected to networks at home, at work, and in numerous other locations. Many users also have home computers that are remotely connected to various organizations from time to time through the Internet. The number of computing devices, and the number of networks that these devices connect to, has increased dramatically in recent years.

In addition, various different types of connections may be utilized to connect to these different networks. A dial-up modem may be used for remote access to an office network. Various types of wireless connectivity, including IEEE (Institute of Electrical and Electronics Engineers) 802.11 and Bluetooth, are also increasingly popular. Wireless networks often have a large number of different users. Moreover, connection to these networks is often very easy, as connection does not require a physical link. Wireless and other types of networks are frequently provided in cafes, airports, convention centers, and other public locations to enable mobile computer users to connect to the Internet. Increasingly, users are also using the Internet to remotely connect to a number of different systems and networks. Thus, it is becoming more common for users to connect to a number of different networks from time to time through a number of different means.

One of the implications of this increasing number of devices occasionally connected to different networks is that traditional corporate firewall technologies are no longer effective. Traditional firewall products guard a boundary (or gateway) between a local network, such as a corporate network, and a larger network, such as the Internet. These products primarily regulate traffic between physical networks by establishing and enforcing rules that regulate access based upon the protocol and type of access request, the source requesting access, the connection port to be accessed, and other factors. For example, a firewall may permit access to a particular computer using TCP/IP on TCP port 80, but deny remote access to other computers on the network. A firewall may also permit access from a specific IP address or range (or zone) of IP addresses, but deny access from other addresses. Different security rules may be defined for different zones of addresses. However, traditional firewall technology guarding a network boundary does not protect against traffic that does not traverse that boundary. It does not regulate traffic between two devices within the network or two devices outside the network. A corporate firewall provides some degree of protection when a device is connected to that particular corporate network, but it provides no protection when the device is connected to other networks.

One security measure that has been utilized by many users is to install a personal firewall (or end point security) product on a computer system to control traffic into and out of the system. An end point security product can regulate all traffic into and out of a particular computer. For example, an end point security product may permit specific applications to access the Internet while denying access to other applications on a user's computer. To a large extent, restricting access to "trusted" applications is generally an effective security method. However, there are cases in which an untrusted or malicious application may "hijack" the connection of a trusted application and cause the hijacked trusted application to perform unauthorized actions on its behalf, thereby circumventing current security mechanisms. For example, a malicious application could hijack Microsoft Internet Explorer to send personal information to an arbitrary destination with a command line similar to the following:

iexplore.exe
www.hackingyou.com/scripts/gotcha.dll?YourPersonalDataHere

Because Internet Explorer is normally a trusted application, this type of attack may not be detected by the user.

What is required is a security solution that loses the vulnerability that currently exists which allows an untrusted or malicious application to "hijack" a trusted application (e.g., by passing information on the command line). The solution should not only address the specific known issue involving exploitation of Internet Explorer, but should also provide a more general solution to the problem of an untrusted application gaining access through the use of a trusted application. The present invention provides a solution for these and other needs.

SUMMARY OF INVENTION

A system providing methods for indirect access control is described. When an attempt to access a network by a first application is detected, a determination is made as to whether at least one other application is attempting indirect network access through the first application. If at least one other application is determined to be attempting indirect network access, each such other application is evaluated to determine if it is approved for network access. If each such other application is approved for network access, access to the network is permitted. Otherwise, access to the network is denied.

DETAILED DESCRIPTION

Glossary

Figure 1:
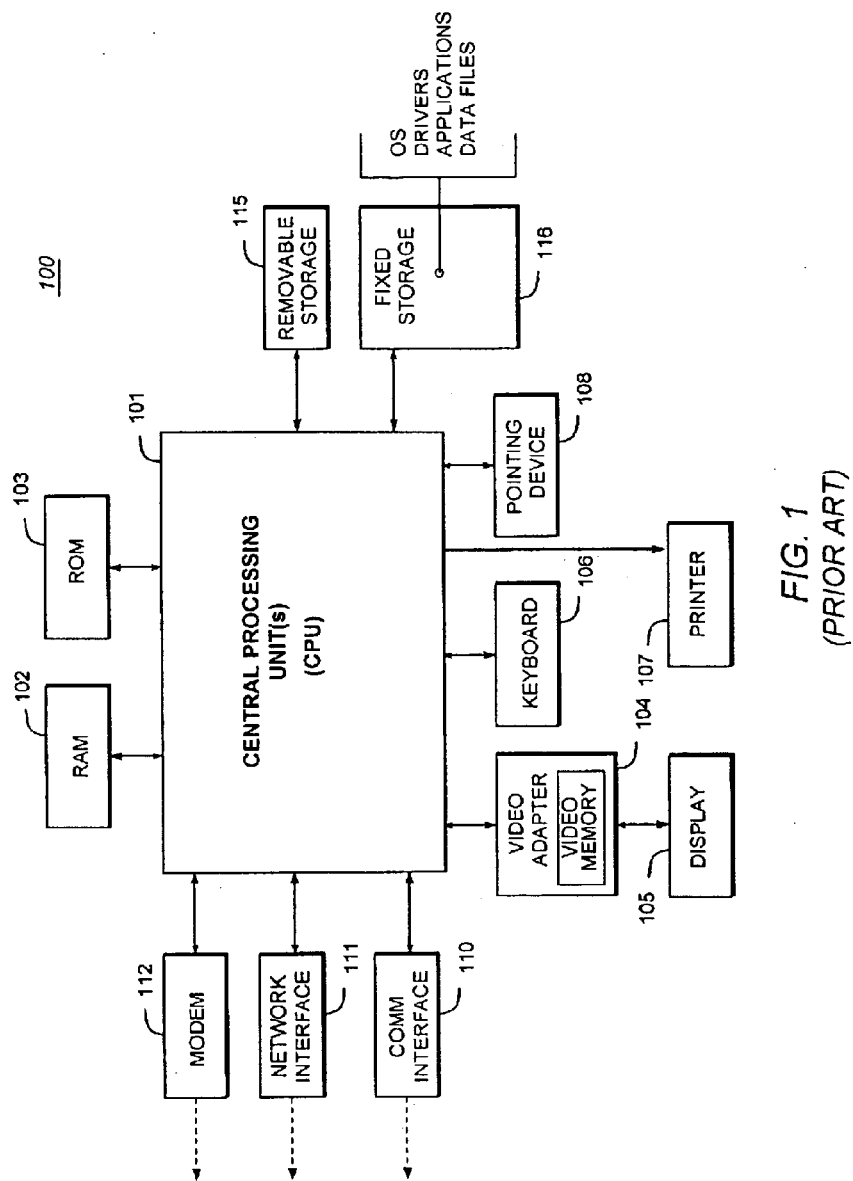
FIG. 1 is a block diagram of a computer system in which software-implemented processes of the present invention may be embodied.

The following definitions are offered for purposes of illustration, not limitation, in order to assist with understanding the discussion that follows.

COM: COM refers to the Component Object Model, which is a software architecture developed by Microsoft to build component-based applications. COM objects are discrete components, each with a unique identity, which expose interfaces that allow applications and other components to access their features. COM objects differ from Windows (Win32) dynamic link libraries (DLLs) because they are language-independent, have built-in interprocess communications capability, and fit more easily into an object-oriented program design. For further information regarding COM, see e.g., Williams, S. et al, "The Component Object Model: A Technical Overview" available from Microsoft Corporation, the disclosure of which is hereby incorporated by reference. A copy of this document is currently available via the Internet at www.msdn.microsoft.com/library.

End point security: End point security is a way of managing and enforcing security on each computer instead of relying upon a remote firewall or a remote gateway to provide security for the local machine or environment. End point security involves a security agent that resides locally on each machine. This agent monitors and controls the interaction of the local machine with other machines and devices that are connected on a LAN or a larger wide area network (WAN) such as the Internet in order to provide security to the machine.

Firewall: A firewall is a set of related programs, typically located at a network gateway server, that protects the resources of a private network from other networks by controlling access into and out of the private network. (The term also implies the security policy that is used with the programs.) A firewall, working closely with a router program, examines each network packet to determine whether to forward it toward its destination. A firewall may also include or work with a proxy server that makes network requests on behalf of users. A firewall is often installed in a specially designated computer separate from the rest of the network so that no incoming request directly accesses private network resources.

HTTP: HTTP is the acronym for HyperText Transfer Protocol, which is the underlying communication protocol used by the World Wide Web on the Internet. HTTP defines how messages are formatted and transmitted, and what actions web servers and browsers should take in response to various commands. For example, when a user enters a URL in his or her browser, this actually sends an HTTP command to the web server directing it to fetch and transmit the requested web page. Further description of HTTP is available in "RFC 2616: Hypertext Transfer Protocol—HTTP/1.1," the disclosure of which is hereby incorporated by reference. RFC 2616 is available from the World Wide Web Consortium (W3C), and is currently available via the Internet at www.w3.org/Protocols/. Additional description of HTTP is available in the technical and trade literature, see e.g., Stallings, W. "The Backbone of the Web," BYTE, October 1996, the disclosure of which is hereby incorporated by reference.

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network" refers broadly to any group of two or more computer systems or devices that are linked together from time to time (or permanently).

Security policy: In general terms, a security policy is an organization's statement defining the rules and practices that regulate how it will provide security, handle intrusions, and recover from damage caused by security breaches. An explicit and well-defined security policy includes a set of rules that are used to determine whether a given subject will be permitted to gain access to a specific object. A security policy may be enforced by hardware and software systems that effectively implement access rules for access to systems and information. Elements of a security policy may include firewall rules and details regarding trusted and untrusted programs, networks, and hosts. These rules and policy details may be stored and enforced on a computer or a network. Further information on security policies is available in "RFC 2196: Site Security Handbook, (September 1997)," the disclosure of which is hereby incorporated by reference. For additional information, see also e.g., "RFC 2704: The KeyNote Trust Management System Version 2," available from the IETF, the disclosure of which is hereby incorporated by reference. A copy of RFC 2704 is currently available from the IETF via the Internet at www.ietf.org/rfc/rfc2704.txt. In this document, "security policy" or "policy" refers to a set of security policies and rules employed by an individual or by a corporation, government entity, or any other organization operating a network or other computing resources.

Task or process: A task or process refers to the combination of a program (e.g., an application program) being executed and associated bookkeeping information used by the operating system. When a program is executed, the operating system creates a new process for the instance of the program being executed. The process (or task) is like an envelope for the program: it identifies the program with a process number (e.g., a process identifier or "ID") and associates other bookkeeping information to the process. Many operating systems, including UNIX and Windows are capable of running many tasks at the same time and are called multi-tasking operating systems. In this document, the terms "task" and "process" are used interchangeably unless otherwise indicated.

TCP: TCP stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see e.g., "RFC 793: Transmission Control Program DARPA Internet Program Protocol Specification", the disclosure of which is hereby incorporated by reference. A copy of RFC 793 is currently available at www.ietf.org/rfc/rfc793.txt.

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., "RFC 1180: A TCP/IP Tutorial," the disclosure of which is hereby incorporated by reference. A copy of RFC 1180 is currently available at www.ietf.org/rfc/rfc1180.txt.

URL: URL is an abbreviation of Uniform Resource Locator, the global address of documents and other resources on the World Wide Web. The first part of the address indicates what protocol to use, and the second part specifies the IP address or the domain name where the resource is located.

Introduction

The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation.

Computer-based Implementation

Basic system hardware (e.g., for desktop and server computers)

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bidirectional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 16 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic system software

Figure 2:
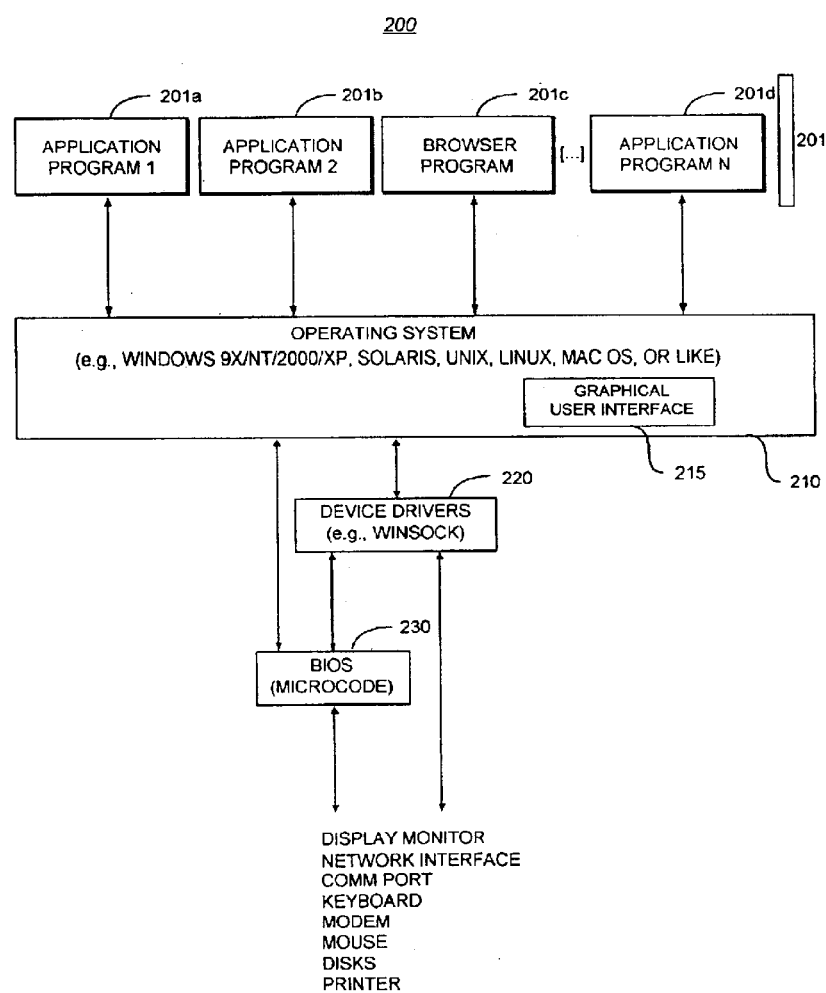
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., personal computers such as the above-described system 100). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview

The present invention closes a vulnerability that currently exists which allows an untrusted application to "hijack" a trusted application (e.g., by passing information on the command line). As described above, a malicious application can exploit a trusted application to obtain network access. For example, a malicious application may be able to obtain access to the Internet to transmit personal information without authorization by launching Internet Explorer with malicious command line parameters.

The present invention comprises a system providing methods for blocking attacks that seek to exploit trusted applications. The general approach of the present invention is to determine whether an application is attempting to use another application to indirectly access a network (e.g., the Internet). The creation of a chain of applications or processes is tracked (e.g., by identifying and storing information regarding the creation of new processes). When an application attempts to access a network (e.g., the Internet), this chain of applications is traversed (or "walked") to determine whether all applications or processes in the chain have been approved for network access based on the currently enforced security policy. If an unknown or untrusted application is discovered in the chain, then network (e.g., Internet) access may be blocked.

An established security policy (set of security rules or settings) dictates how the computer should behave in the case of unknown or untrusted applications attempting to directly or indirectly access the network. For example, the security policy may specify that the end user should be notified of the request for access by the untrusted application. If the user has previously denied access by an application (e.g., established a security policy permission setting indicating the untrusted application is not allowed access), then access is typically denied without prior notification to the user (i.e., without an "ask permission" dialog in the user interface). However, in the case of a request for access by an application that is unknown or not already covered by a permission setting, the security policy may specify that the user be prompted to take appropriate action, including approving or disallowing access. Those skilled in the art will appreciate that other variations of this approach for authorizing or denying indirect access by an application may also be used, as desired.

One example of a situation in which the present invention may be advantageously applied is a parent-child process chain. The operations of the present invention in the context of a parent-child process chain may be illustrated by the example of a task or process A launching process B, with process B (e.g., Internet Explorer) accessing the Internet. It should be noted that this is only one example of the application of the present invention. Those skilled in the art will appreciate that the methodology of the present invention is not limited to that of a parent-child process chain and may also be applied in other circumstances. In the currently preferred embodiment a list of applications (or processes) that are allowed to be a parent of another process (or application) is created within the security policy. Another list of applications or processes that are not allowed to be a parent of another process is also created within the security policy. When a particular application requests network access (e.g., access to the Internet), the security policy is consulted to determine whether or not to permit access. If a parent application discovered in the process chain is approved, then access by the application through other applications is permitted. If an application in the chain is not approved to be a parent of another process, then all requests for access by such process are disallowed. If an application is not on either the approved or disapproved list, then the user is typically asked as to whether the application should be approved for access. Based upon the user's answer, the application is added to either the approved or disallowed list.

If the system and methodology of the present invention is utilized, when Internet Explorer (process B) requests access to the Internet, the process chain is examined. In this situation, a check is made to determine whether process A is allowed to be a parent of process B. If process A has previously been approved or disapproved as a parent process, then this setting (allow or disallow) is retrieved (e.g., from a rules database or repository) and applied. If process A has not yet been approved or disapproved, an event is issued to the user interface for the user to determine whether or not to approve process A as a parent process. The answer received from the user is then applied to the current request for access and is also stored (e.g., in a database or repository) for application in the event of subsequent requests from process A unless and until the permission settings applied to process A are modified.

In the currently preferred embodiment, all applications in a parent-child process chain must be approved before a process is allowed network access. Generally, "ask permission" type dialogs are not presented in the user interface of the system until the system verifies that no application in the parent-child process chain has a "disallow" permission setting. If any application in the process chain has a "disallow" permission setting, then access is typically blocked without displaying an "ask permission" type dialog in the user interface.

The system of the present invention, in its presently preferred embodiment, also includes a security policy setting enabling a user to activate or disable the examination of applications in the process chain. For example, a user may set a "Disable Parent Check" flag to "yes" to skip investigation of the process chain. Alternatively, in the currently preferred embodiment, a user may disable this feature by setting a general application security setting to "medium" or "low."

The methodology of the invention may also be used in situations more complex than this simple example of a parent-child process chain in which one application launches another application. For instance, the present invention may also be employed in an environment in which the Component Object Model (COM) is used to create interoperable components and applications. An application C running in a COM environment may, for example, launch application D as a COM server using a COM API function, such as "CoCreateInstance( )". In this situation, the system of the present invention provides for using a driver to detect and provide notification (e.g., by hooking the appropriate areas of the Windows operating system kernel) when application C invokes application D as a COM server.

Upon receiving notice that application C is using the COM server to invoke application D, the system of the present invention retains information about this client-server relationship (e.g., stores the client-server relationship in non-durable memory). If and when application D accesses the network (e.g., the Internet), a message handling routine is invoked to examine whether or not access to the network should be allowed. In addition to what is described above in the discussion of the parent-child process chain, this message handling routine examines the chain of COM client-server relationships to check all members of the COM client-server chain against the security policy. Based upon the results of this examination, indirect access may then be permitted or denied in the manner described above. An exemplary environment in which the present invention may be preferably embodied will now be described.

System Components

Figure 3:
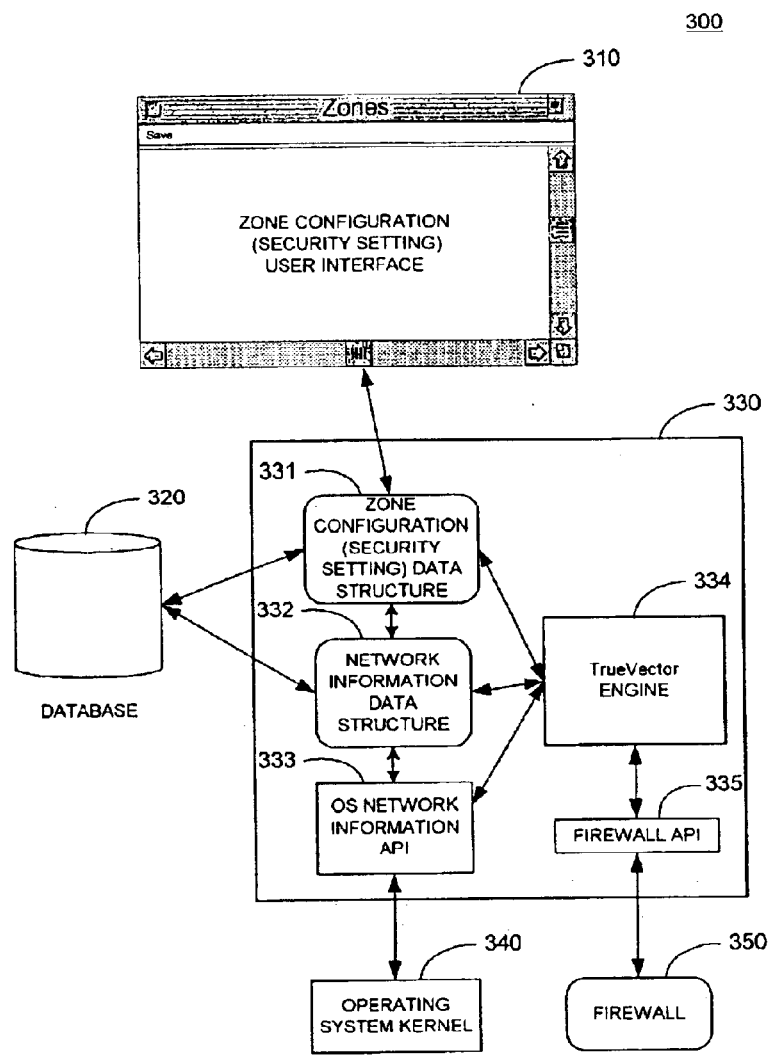
FIG. 3 is a block diagram of an environment in which the present invention may be embodied.

FIG. 3 is a block diagram of an environment 300 in which the present invention is preferably embodied. As shown on FIG. 3, environment 300 includes a security setting (or zone configuration) user interface 310, a database 320, a security system 330, an operating system kernel 340 and a firewall 350. Security system 330 includes a zone configuration (security setting) data structure 331, a network information data structure 332, an OS network information API 333, a TrueVector (r) engine 334, and a firewall API 335. Each of these components will now be described in more detail.

The zone configuration (security setting) user interface 310 is a configuration tool that enables a user or administrator to establish security settings and apply those settings to one or more machines or subnets. The zone configuration user interface 310 is connected to the security system 330. The zone configuration settings (or security settings) established for the current machine or network are stored in the zone configuration (security settings) data structure 331. The zone configuration settings, which comprise security settings or rules for particular networks or groups of machines, are also persistently stored in the database (or policy module) 320. In the currently preferred embodiment, the database 320 is a hierarchical object-oriented database. However, the database 320 could alternatively be a relational database, a file system, and/or any other form of persistent storage. The network information data structure 332 includes information about the network or networks to which a device is currently connected and also contains the profile of these networks. Information regarding networks to which a device has been connected is persistently stored in the database 320.

The OS network information API 333 is an interface used to obtain network information from the operating system kernel 340. For example, the OS network information API 333 may be used to obtain an IP address of a particular adapter, or multiple IP addresses of devices on a particular subnet. The OS network information API 333 is also used to determine the MAC address of any router or other gateway device that is serving the local subnet. A MAC address is a unique identification number that is assigned by the manufacturer to a specific router or device. For example, when a router sends a packet to another router, the router transmitting the packet identifies itself by both an IP address and a MAC address. Each operating system provides some facility to discover network information, including IP and MAC addresses. The OS network information API 333 enables the security system 330 to utilize this underlying operating system facility to obtain network information that is required to detect and profile different networks. As described below, different operating systems provide different facilities for the provision of network information.

The TrueVector(r) engine 334 receives messages regarding events and uses event handlers to process and respond to these messages. The engine 334 also sends messages to other components, for example a message through the firewall API 335 to make a configuration change to the firewall 350. In the currently preferred embodiment, security and behavioral policy definition and enforcement (e.g., definition and enforcement of firewall, network access, and anti-virus policies) are provided by the TrueVector(r) engine available from Zone Labs, Inc. and described in further detail in commonly-owned U.S. Pat. No. 5,987,611, entitled "System and Methodology for Managing Internet access on a per Application basis for Client Computers Connected to the Internet," the disclosure of which is hereby incorporated by reference.

The TrueVector engine 334 acts as a supervisor module for enforcing a security policy (i.e., set of security rules). The TrueVector engine can be used to enforce a variety of different types of security policies or rules. These security policies may include application permission rules, such as a rule preventing access to particular resources by a particular application (e.g., a RealAudio player application "ra32.exe") or a rule permitting access to only administrator or user-approved applications. Similarly, a policy or rule can be established requiring a particular application to have a verifiable digital signature. Apart from application-based rules, policies can be established on the basis of non-application activities or features. For example, rules can also be established on the basis of including and/or excluding access to particular Internet sites. These security policies can be customized by a user or administrator and a multitude of different types of policy rules can be established and enforced, as desired. Further information regarding the establishment and enforcement of security policies is provided in commonly-owned application Ser. No. 09/944,057, filed Aug. 30, 2001, entitled "System Providing Internet Access Management with Router-based Policy Enforcement," and in commonly-owned application Ser. No. 10/159,820, filed May 31, 2002, entitled "System and Method for Security Policy Arbitration." The foregoing references are hereby incorporated by reference in their entirety, including any appendices or attachments thereof, for all purposes.

The firewall API 335 is used to enable dynamic configuration of the firewall 350. The firewall 350 is a firewall that includes a means to configure IP address groups, which are used to specify trusted zones and other zones. For example, using the firewall API 335, a computer or device (or a group of computers and devices) can be added to a trusted zone maintained by the firewall 350 without having to change the security settings applicable to that trusted zone. The specific operations of the firewall 350, the TrueVector engine 334, and other components of the security system 330 in conjunction with the indirect access control methodology of the present invention are described in more detail below.

Indirect Access Control Operations

Figure 4:
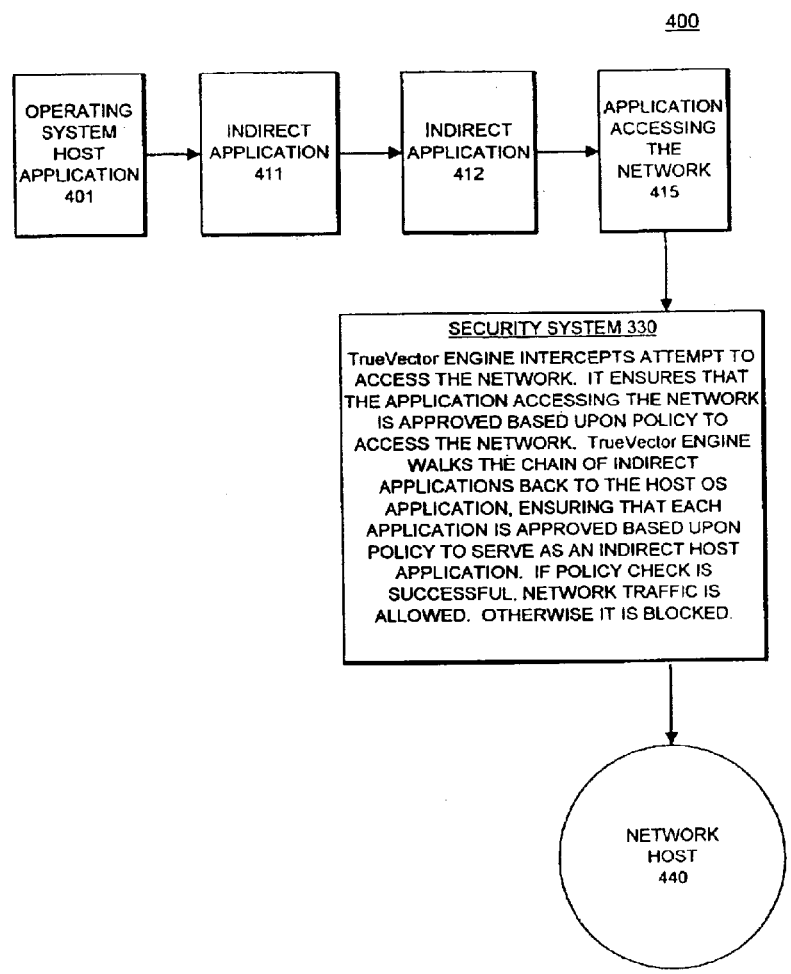
FIG. 4 is a block diagram of an environment illustrating the operations of the present invention in controlling indirect access to a network.

FIG. 4 is a block diagram of an environment 400 illustrating the operations of the present invention in controlling indirect access to a network. As shown, an operating system host application 401 connects via indirect applications 411 and 412 to an application accessing the network 415 in order to attempt to access the network host 440. Also shown at FIG. 4 is the security system 330. The operations of the security system 330 and the other components of environment 400 in connection with an exemplary request for access to the network will next be described.

The operating system 401 is the root of all of the applications illustrated at FIG. 4 (i.e., applications 411, 412, 415) as these applications are launched by the operating system. In this example, the operating system 401 launches an indirect application 411 (e.g., the Windows shell), which provides a graphical user interface for accepting commands (e.g., mouse clicks) from a user. Indirect application 411 may then, in turn, launch another indirect application 412 (e.g., in response to a mouse click by the user). For instance, in response to user input the Windows shell (indirect application 411) may launch an indirect application 412 named "malware.exe". Indirect application 412 (malware.exe) thus becomes a child of the Windows shell (application 411). Next, this indirect application 412 may use a Windows API function, such as "CreateProcess( )", to launch yet another application 415 (e.g., Internet Explorer), in an attempt to access a network (e.g., the Internet) through application 415. The resulting process relationship is the parent-child chain going from the application accessing the network 415 back through indirect applications 412, 411 to the operating system 401 as depicted at the top of FIG. 4.

The request by application 415 to access the network host 440 is intercepted (or otherwise received) by the security system 330. The TrueVector engine of the security system 330 first checks to determine whether the application accessing the network 415 (e.g., Internet Explorer in this example) is approved for network access. Assuming that application 415 is approved for network access, the TrueVector engine then walks (i.e., traverses) the process chain to examine each application in the above-described process chain before determining whether to allow the request for network access by application 415. This examination of the parent process chain starts at application 415 by determining which application (e.g., application 412) created the process requesting access at application 415. To enumerate all applications, the process chain is walked backwards in a similar fashion (e.g., from application 412 through application 411) until the operating system 401 is reached.

After the process chain is enumerated, the security system 330 evaluates the applications that are listed (e.g., indirect application 411, 412 as well as application 415) based upon applicable access rules (e.g., permission settings stored in a database or repository such as database 320 as previously illustrated at FIG. 3) for known applications. In the currently preferred embodiment, the TrueVector engine of the security system 330 determines whether a policy (permission setting)

has been established for each of the applications in the process chain. In particular, a permission setting may indicate whether or not a given application (i.e., a known application that is subject to a permission setting or rule) is permitted to use other applications to access the network on its behalf. For example, a permission setting may indicate that a particular application is authorized to use other applications to access the network. If each of the indirect applications in the process chain is approved for indirect access to the network, then network traffic is allowed. Firewall settings that permit the traffic may also be adjusted as a result. However, if any one of the applications in the process chain has a setting indicating that it may not use other applications to access the network, then the request for network access is denied.

This policy (permission setting) may be established by a user, by a network administrator to centrally control such matters, or by a pre-configured setting, as desired. The applications that are permitted to use other applications for network access may be defined in advance by a network administrator (e.g., in the case of a corporate network) and applied to all machines accessing a given network to consistently enforce an access policy for an organization. Alternatively, an individual user may establish applicable network access permission settings (e.g., a user of a stand alone computer connecting to the Internet via an Internet Service Provider). A user or administrator may establish such settings in advance or reactively in response to notification events (e.g., notification events issued to the user interface).

In the event an application is encountered that does not have an established permission setting, the user is typically consulted as to whether or not to permit access. For instance, if the "malware.exe" application referred to in this example is unknown (e.g., had not previously been encountered and is not subject to an established security rule or setting), then the user is typically notified (e.g., via an "ask permission" dialog in the user interface) and access is denied until a response is received from the user. The user may then elect to permit or deny access, as desired. As an alternative to asking the user as to whether or not to permit access, a rule may be established (e.g., by a network administrator or a user) to automatically deny (or permit) access in the case of a request for access by a new or unknown application. In a situation in which a user interface is not available (e.g., a centrally managed security solution), an established rule will typically be applied in the case of a request from an unknown application. Those skilled in the art will appreciate that a number of other approaches for authorizing or denying indirect access by an application may also be used, as desired. The following discussion will illustrate permission-setting features provided in the currently preferred embodiment of the present invention.

Preferred User Interface

Figure 5A:
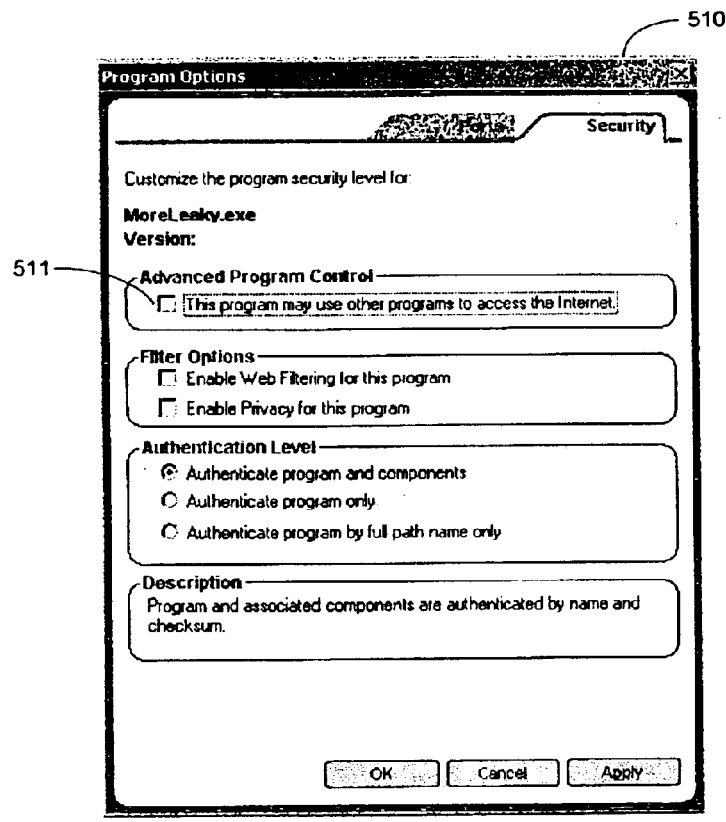
FIG. 5A illustrates a preferred application security setting user interface for the currently preferred embodiment of the present invention.

FIG. 5A illustrates a preferred application security setting user interface 510 for the currently preferred embodiment of the present invention. As shown, the preferred application security setting user interface panel 510 includes a program control check box 511 enabling a user to decide whether to permit a particular application to use other applications to access the Internet. This program control check box 511 enables a user to specify on an application-by-application basis whether or not applications are permitted to act as a parent application in a process chain in order to access a network. In the current preferred embodiment, selecting check box 511 enables automatic approval of a program as a parent process. If check box 511 is left unchecked, an alert will be issued to the user interface to ask the user whether or not to permit access when the program in question is used as a parent of a program accessing the network.

Figure 5B:
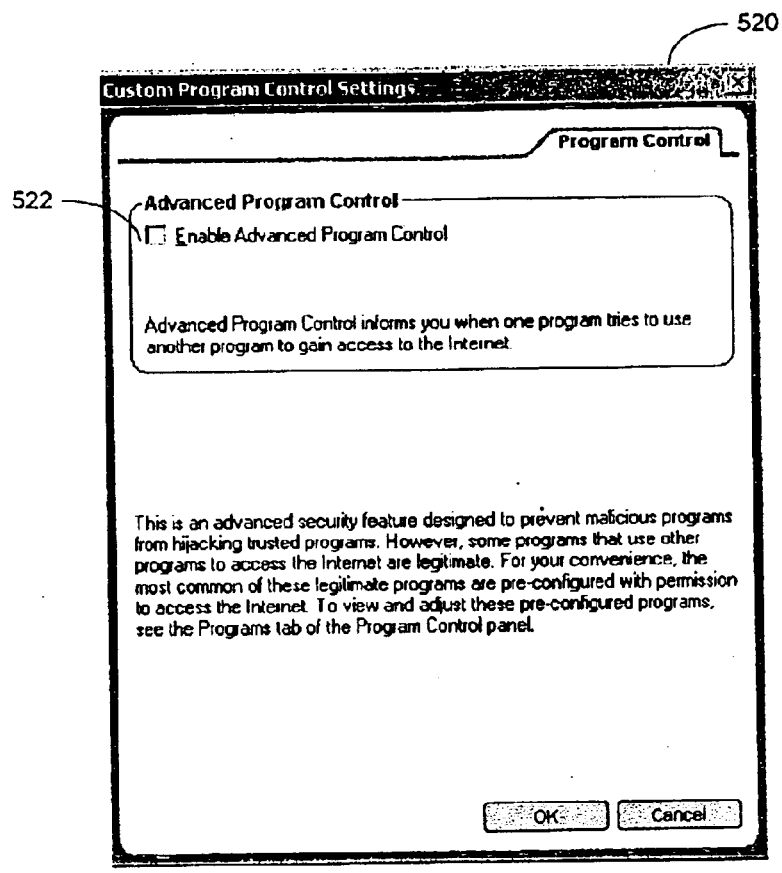
FIG. 5B illustrates a custom program control user interface of the currently preferred embodiment.

FIG. 5B illustrates a custom program control user interface 520 of the currently preferred embodiment. As shown, the custom program control user interface 520 includes an advanced program control check box 522 which enables a user to enable or disable the entire process of indirect access checking on a general basis. Currently, a user must select check box 522 to enable indirect access checking. If check box 522 is not selected, then the indirect access control feature is disabled for all applications by default. A user may, for instance, elect not to utilize this indirect access control feature as it can be "noisy"—meaning that it may generate a number of "ask permission" type alerts in the user interface if it has not been appropriately configured. For example, if a user has Microsoft Outlook and clicks on a web link inside of Outlook, this creates an instance of Internet Explorer that opens the web link. As a result, the user may get an "ask permission" alert if the system has not been properly pre-configured. Thus, an option is provided to deactivate the indirect access control feature in the currently preferred embodiment.

Figure 5C:
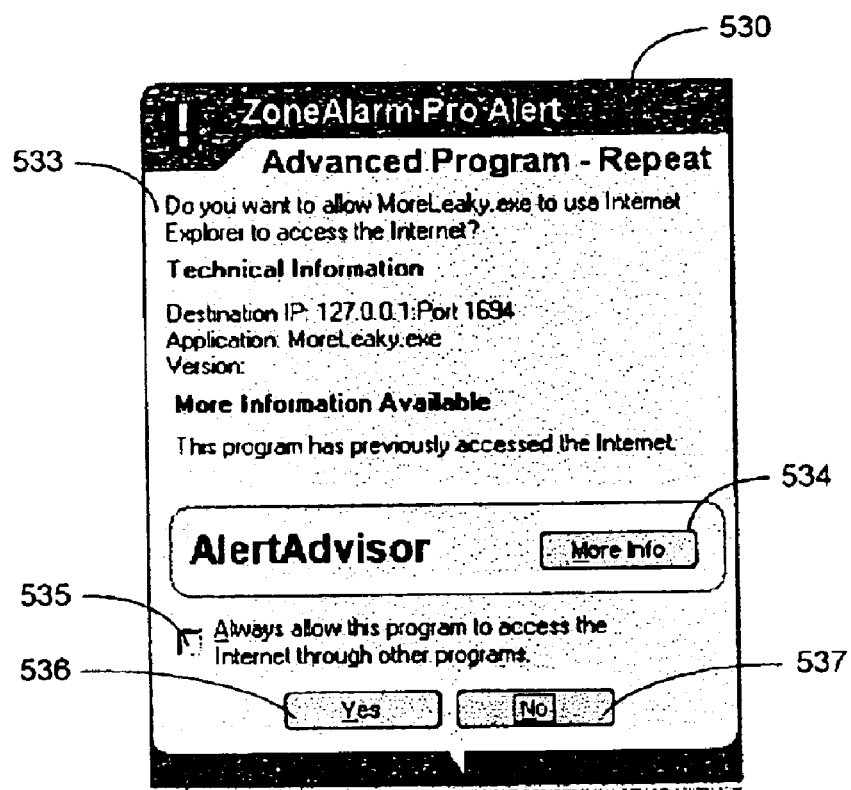
FIG. 5C illustrates an exemplary alert dialog box that is presented in the user interface.

FIG. 5C illustrates an exemplary alert (or "ask permission") dialog box 530 that is presented in the user interface. Dialog box 530 illustrates an alert that is received with respect to an exemplary application named "More-Leaky.exe". The text in text box 533 informs the user that this application is trying to indirectly access the network and asks the user whether he or she wants to permit this application (i.e., MoreLeaky.exe) touse Internet Explorer to access the Internet. Button 534 enables the user to obtain additional information regarding the alert. Check box 535 is a "remember the answer" feature that allows the user to have the same answer applied to future requests for access by this application. A user may select button 536 ("yes") to permit access or may select button 537 ("no") to deny indirect access by the application.

Detailed Operation

Figure 6A:
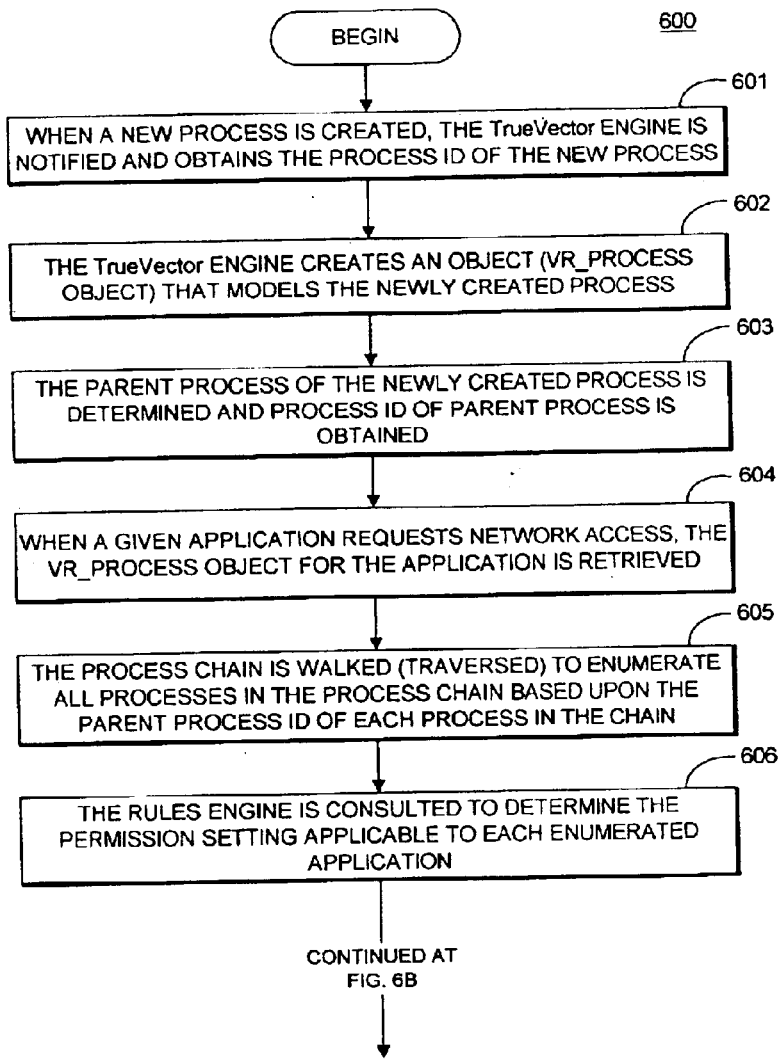
FIGS. 6A–B comprise a single flowchart illustrating the high-level methods of operation of the system of the present invention in controlling indirect access to a network.
Figure 6B:
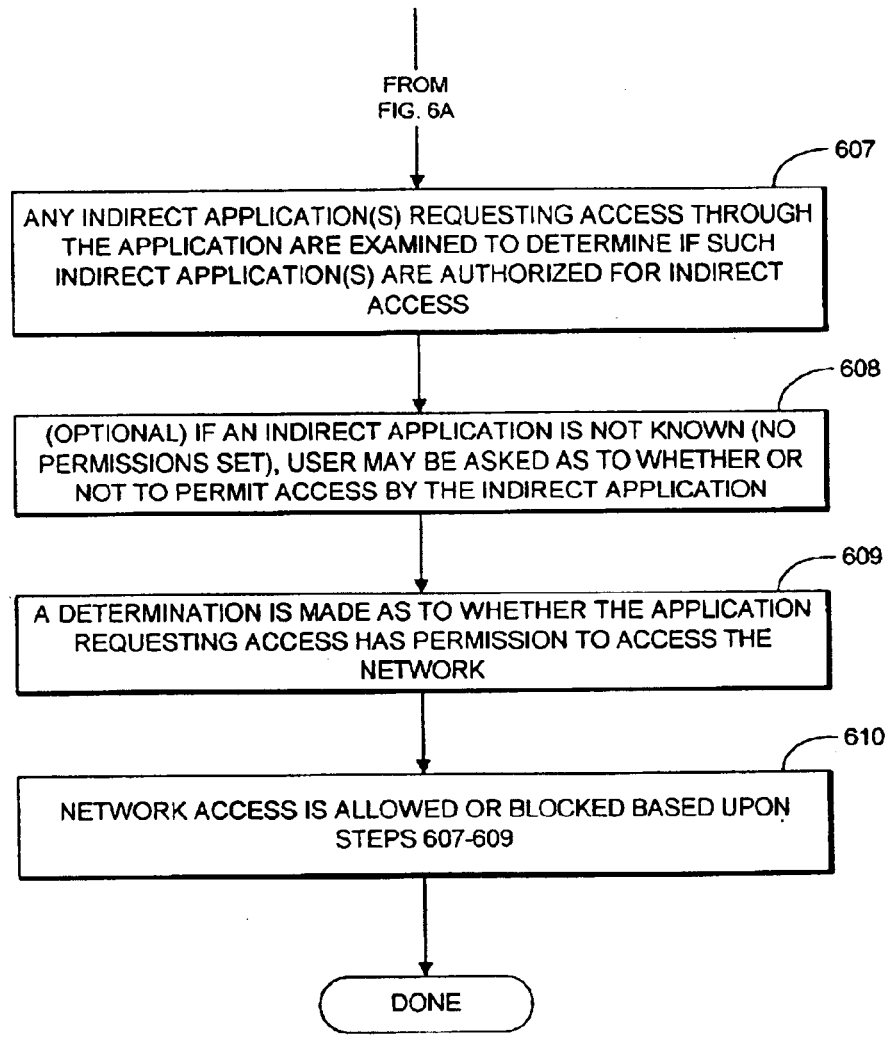

FIGS. 6A–B comprise a single flowchart 600 illustrating the high-level methods of operation of the system of the present invention in controlling indirect access to a network. The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., web server). The following discussion uses the operations of the system of the present invention in a Microsoft Windows operating environment as an example; however, a similar approach may also be used in other operating environments. To illustrate the operations of the present invention, the following also uses as an example the examination of a parent-child process chain in which one application launches another application. However, the system and methodology of the present invention is not limited to use in this parent-child process chain context. For example, the indirect access control methodology of the present invention may also be employed in a Component Object Model (COM) environment for examination of COM client-server relationships.

In an exemplary Windows environment, a driver is implemented to notify the TrueVector engine when an application invokes "CreateProcess( )", which is a Windows API function. When a new process is created (e.g., when an application invokes "CreateProcess( )"), at step 601 the driver notifies the TrueVector engine (VSMon) that a new process has been created and passes (among other things) the process ID of the newly created process to the True Vector engine. At step 602 the TrueVector engine creates a "VR_PROCESS" object that models the newly created process.

After receiving notification of the newly created process and creating a "VR_PROCESS" object, the engine gathers important information about the process (e.g., name and an associated image if applicable). Of particular interest, at step 603 the parent of the newly-created process is determined. The specific procedure for determining the parent differs on different operating environments. For example, in a Windows NT environment, an "NtQueryInformationProcess" API is called to obtain information about a specified process (including the parent of the specified process). A different procedure is used in a Windows 98 environment to obtain information about a given process and its parent process. As a result of this step the engine obtains the parent process ID (i.e., the process ID of the parent process). This information about the parent process is retained by the TrueVector engine.

When a given application requests network access (e.g., Internet Explorer requests access to the Internet), at step 604 the engine locates the "VR_PROCESS" object for the application (directly) requesting network access. Recall that the "VR_PROCESS" object models the process in a format that is understood by the engine and includes the process ID of the parent of the application requesting access. At step 605, if the indirect access control system of the present invention is enabled, the parent-child process chain is walked (i.e., traversed) as described above using the parent process ID of each process in the chain. The parent of each process, its process ID, and the other information which was gathered as a result of the foregoing steps are used to enumerate all processes in the process chain. For example, using the parent process ID found in the "VR_PROCESS" object for the current process, one can locate the "VR_PROCESS" object of the parent of the current process (i.e., a second "VR_PROCESS" object for the parent of the first application). This step may be repeated in the event that the parent of the first process also has a parent, and so on and so forth, until all processes in the process chain are enumerated.

After process information has been gathered, at step 606 the rules engine (or database) is consulted to determine the permission setting (policy or rule) applicable to each of the applications enumerated as a result of the above steps. At step 607 the indirect application(s) that are using this application are examined to determine if such application(s) are approved for indirect access. As described above, the rules engine may apply a defined permission setting to allow or disallow indirect access for a known application (i.e., one having an established permission setting).

If the application is not known, then at optional step 608 a dialog box may be presented to the user (i.e., an "ask permission" dialog box as described above) asking the user as to whether indirect access by the application should be permitted. Alternatively, a pre-determined rule (e.g., disallow indirect access for unknown applications) may be applied without presenting a dialog box to the user. It should be noted that the TrueVector engine may immediately permit or deny the request for network access (e.g., in the event that all applications in the process chain are known). Alternatively, the TrueVector engine may indicate an "answer pending" status which blocks access until a determination is made that access should be permitted (e.g., in the event that the user is to be asked as to whether or not to permit indirect access). In the currently preferred embodiment, the system has the ability to suspend an application while a determination about whether or not to allow access by the application is pending.

At step 609 the TrueVector engine determines whether the application requesting network access has permission to access the network. It should be noted that for a given application, access might be permitted in certain cases but not in others. For example, an application may be permitted to access a local network but may be precluded from accessing the Internet. As another example, an application may be permitted to access a network as a client, but precluded from acting as a server.

At step 610 the TrueVector engine allows or blocks the request for network access based upon the results of the prior steps 607–609. For example, the instance of Internet Explorer that is requesting access to the Internet on behalf of the above-described "malware.exe" application may be denied access to the Internet. However, another instance of Internet Explorer that is launched directly from the Windows shell may be permitted to access the Internet. In the currently preferred embodiment, the result of checking parent processes is saved through the use of a Boolean flag in the "VR_PROCESS" object for the initial application requesting network access that indicates the parent processes have been checked. An example of the use of present invention in controlling indirect access in a Component Object Model (COM) environment will now be described.

Operations in COM Environment

Figure 7A:
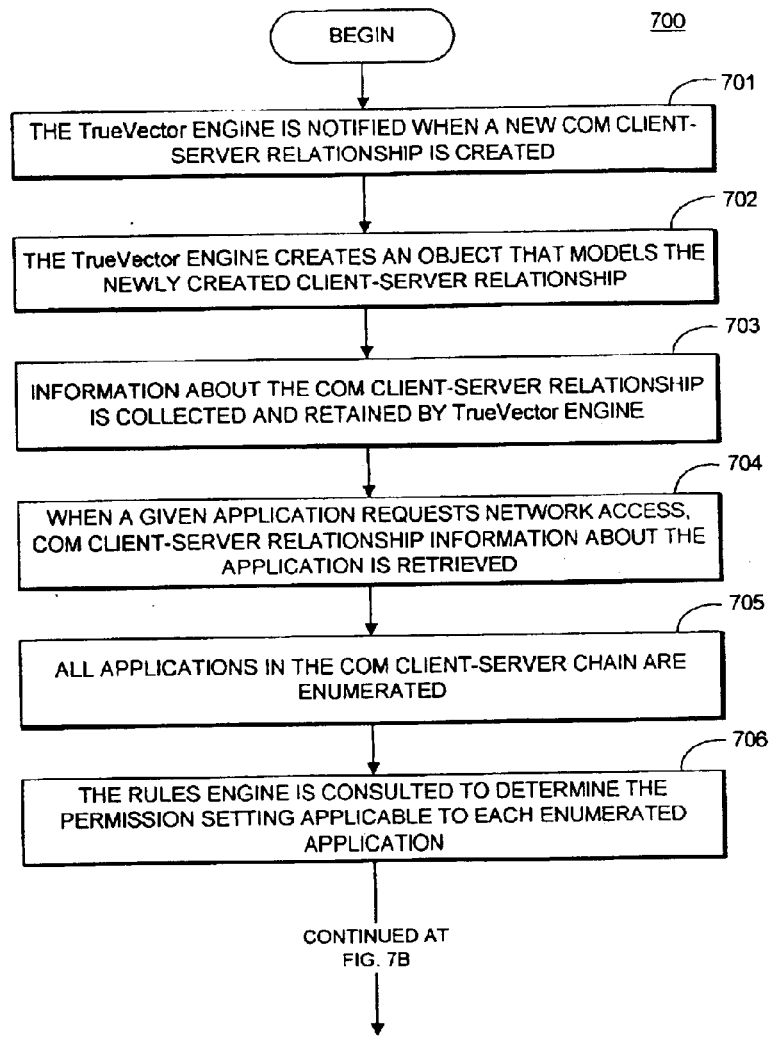
FIGS. 7A–B comprise a single flowchart illustrating the high-level methods of operation of the system of the present invention in controlling indirect access to a network in a COM environment.
Figure 7B:
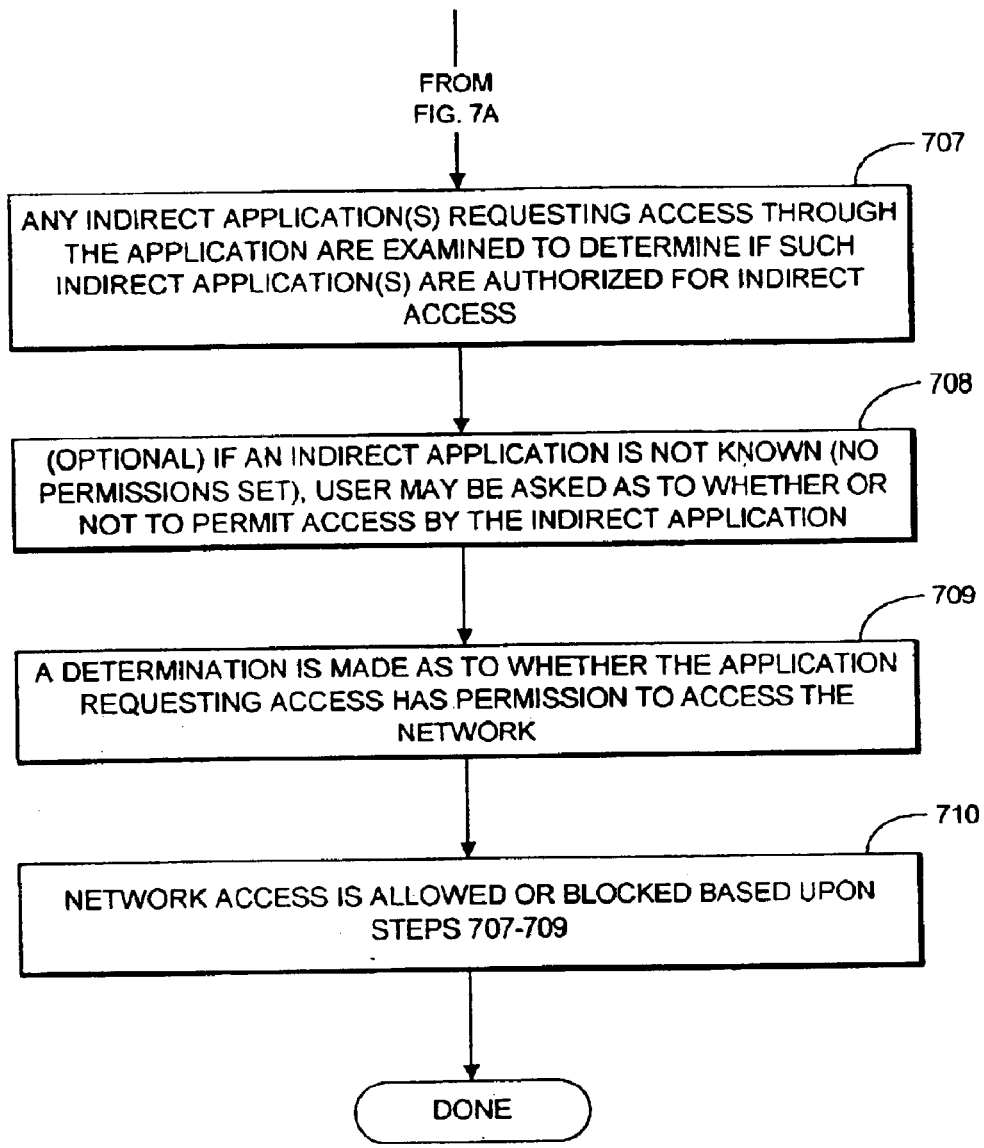

FIGS. 7A–B comprise a single flowchart 700 illustrating the high-level methods of operation of the system of the present invention in controlling indirect access to a network in a COM environment. The following discussion uses the operations of the system of the present invention in a Microsoft Windows operating environment as an example; however, a similar approach may also be used in other operating environments.

In an exemplary Windows environment, a driver is implemented to notify the TrueVector engine when a first application launches a second application as a COM server (e.g., by using a function call such as "CoCreateInstance( )"). When a first application launches a second application as a COM server (e.g.; when an application invokes "CoCreateInstance( )"), at step 701 the driver notifies the TrueVector engine (VSMon) of the COM client-server relationship. At step 702, when the TrueVector engine receives a notification from the driver of the creation of a new COM client-server relationship, the TrueVector engine creates an object that models the relationship.

At step 703 the TrueVector engine collects and retains information about the COM client-server relationship. When a given application requests network access (e.g., Internet Explorer requests access to the Internet), at step 704 the engine locates the information about COM client-server relationships for the application (directly) requesting network access. At step 705 the other information which was gathered as a result of the foregoing steps is used to enumerate all applications indirectly requesting network access through COM client-server relationships.

At step 706 the rules engine (or database) is consulted to determine the permission setting (policy or rule) applicable to each of the enumerated applications. At step 707 the chain of COM client-server relationships is examined to check all members of this chain against the security policy in a manner similar to that described above for parent-child process relationships. If an application in the COM client-server chain is not known, then at optional step 708, a dialog box may be presented to the user (i.e., an "ask permission" dialog as described above) asking the user as to whether indirect access by the application should be permitted. Alternatively, a pre-determined rule may be applied as described above to immediately permit or deny the request (e.g., in the event that all applications in the chain are known).

At step 709, the TrueVector engine determines whether the application requesting network access has permission to access the network. As described above, for a given application, access might be permitted in certain cases but not in others. At step 710, the TrueVector engine allows or blocks the request for network access based upon the results of the prior steps 707–709. The operations of the system of the present invention in controlling indirect access will now be described in greater detail using a parent-child process chain as an example.

Obtaining Process Information and Controlling Indirect Access

Methods/functions for indirect access control

The following C++ header file lists data members of a "VR_PROCESS" class as well as several methods (or functions) of the class that are used in the system of the present invention for indirect access control:

```
1:     //start .h portion
2:     class VR_PROCESS: public VR_FILE {
3:     typedef VR_FILE BASE;
4:     public:
5:         VR_PROCESS( );
6:         VR_PROCESS(PVR_SESSION pSession,
7:             DWORD dwNewProcessID,
8:             CHAR *pCmdLine);
9:
10:        virtual ~VR_PROCESS( );
11:
12:        virtual BOOL WINAPI GetParentPID(VOID);
13:        //
14:        // Retrieves parent process ID
15:        //
16:        // return         success
17:
18:        virtual BOOL WINAPI LoadInfo( PVR_PROCESS pOrigEventProc = 0 );
19:
20:        virtual DWORD WINAPI TriggerEvent(
21:            DWORD dwEventMsg,          // Event message #
22:            PVR_BASE pBase,            // Object that actually triggered the event
23:            PVSMSG pMsg = NULL,        // vsdata Message that triggered the event
24:            LPVOID pData = NULL,       // Additional data (based on message)
25:            DWORD dwDataLen = 0,       // Lengths (of additional data)
26:            VR_PROCESS* pProcRoot = NULL);   // Root process (used when checking parent proc chain)
27:
28:        BOOL WINAPI IsExcludedParentProc( VOID );
29:
30:        DWORD    dwProcessID;          // this process ID
31:        DWORD    dwParentProcessID;    // process ID of parent process
32:
33:        //... a bunch of other data members
34:
35:        // Parent process checking stuff
36:    protected:
37:        PVR_PROCESS                    m_LastParentChecked;
38:        std::vector<PVR_PROCESS>       m_Parents;
39:
40:    private:
41:        BOOL                           m_ResubmitByParentProc;//this tells us that this was submitted via a parent proc
42:        CRITICAL_SECTION               m_CritSecProcessesInQue;
43:        DWORD                          m_bProcessesInQue; //makes sure no one deletes this before it can be cleared
44:        BOOL    m_bResubmitByVsmon;
45:        static std::deque<VR_PROCESS*>    ms_VRProcessQue;
46:        BOOL                           m_bDirectlyAccessedNetwork;
47:
48:    public:
49:        VOID SetDirectlyAccessedNetwork(BOOL b) { m_bDirectlyAccessedNetwork = b; }
50:        BOOL GetDirectlyAccessedNetwork(VOID) { return m_bDirectlyAccessedNetwork; }
51:    };
52:    // end .h portion
```

As shown at line 12, the "GetParentPID" function is responsible for retrieving the parent process ID of a given process. It includes operating environment-specific methods for determining the parent process ID of a process. The next function listed is "Loadinfo" shown at line 18 above. "Loadinfo" is the function that gathers information about a process, including parent process ID information via calls to "GetParentPID". In the currently preferred embodiment, "Loadinfo" can operate either synchronously (i.e., in which the driver waits until it returns) or asynchronously (in which a "pending" status is returned to the driver as previously described, and "Loadinfo" operates offline (i.e., in the background) to gather the appropriate information).

Of particular interest, the "TriggerEvent" method illustrated at line 20 is the method that is activated when an application attempts to access the network. This method is a message handling routine that is invoked with a message event and looks for events indicating a process is attempting to access a network. The "TriggerEvent" method is described in more detail below.

As shown at lines 30–31, data members of the "VR_PROCESS" class include the process ID of the current process ("dwProcessID") and the parent process ID ("dwParentProcessID"). At line 37, a pointer to a "VR_PROCESS" object indicates the last parent process checked, which enables the current position to be tracked as the process chain is traversed. At line 38, a "std::vector<PVR_PROCESS>m_Parents" vector object contains all parents of a given process. As a process chain is traversed, this vector object is filled with a list of all of the parents of the given process. A flag ("BOOL m_bDirectlyAccessedNetwork") illustrated at line 46 indicates if an application directly or indirectly accessed the network. The flag is set to indicate whether the current process is either directly accessing the network or is accessing it indirectly. Certain methods (or functions) which illustrate the operations of the present invention will next be described.

Creating VR_PROCESS object

The following "InitVRProcess" function serves to initialize a "VR_PROCESS" object when a new process is created:

```
 1:    VOID WINAPI InitVRProcess(VOID)
 2:    //
 3:    // Initilizes process stuff
 4:    //
 5:    {
 6:        if (!dwSystemPath)
 7:            dwSystemPath = GetSystemDirectory(cSystemPath, sizeof(cSystemPath) - 2);
 8:
 9:        if( IsWinNT( ) )
10:        {
11:            strcpy( g_szSmssExe, cSystemPath );
12:            if( strlen("\\smss.exe") + dwSystemPath < MAX_PATH )
13:            {
14:                strcat( g_szSmssExe, "\\smss.exe" );
15:            }
16:        }
17:
18:        // win9x system proc's
19:        if( IsWin95 ( ) ||
20:            IsWin98SE( ) ||
21:            IsWinME( ) )
22:        {
23:            strcpy( g_szMsgSrvExe, cSystemPath );
24:            if( strlen("\\msgrv32.exe") + dwSystemPath < MAX_PATH )
25:            {
26:                strcat( g_szMsgSrvExe, "\\msgrv32.exe" );
27:            }
28:
29:            strcpy( g_szMprExe, cSystemPath );
30:            if( strlen("\\mprexe.exe") + dwSystemPath < MAX_PATH )
31:            {
32:                strcat( g_szMprExe, "\\mprexe.exe" ) ;
33:            }
34:
35:            strcpy( g_szKernel, cSystemPath );
36:            if( strlen("\\kernel32.dll") + dwSystemPath < MAX_PATH )
37:            {
38:                strcat( g_szKernel, "\\kernel32.dll" );
39:            }
40:
41:            strcpy( g_szMsTaskExe, cSystemPath );
42:            if( strlen("\\mstask.exe") + dwSystemPath < MAX_PATH )
43:            {
44:                strcat( g_szMsTaskExe, "\\mstask.exe" );
45:            }
46:
47:            // only applies to WinMe
48:            strcpy( g_szSpoolExe, cSystemPath );
49:            if ( strlen("\\spool32.exe") + dwSystemPath < MAX_PATH )
50:            {
51:                strcat( g_szSpoolExe, "\\spool32.exe" );
52:            }
```

-continued

```
53:           }
54:
55:
56:           InitModule( );
57:           // init critical section for protecting the deque
58:           InitializeCriticalSection( &
VR_PROCESS::ms_CritSecVRProcessQue );
59:           // init the event to pulse when we added something
to the dequeue
60:           VR_PROCESS::ms_hPInfoLookupThreadEvent = CreateEvent(
NULL, FALSE, FALSE, NULL );
61:           // init the boolean that says shutdown to the thread
62:           VR_PROCESS::ms_bKillPInfoLookupThread = FALSE;
63:           // start the thread
64:           VR_PROCESS::ms_hPInfoLookupThread =
              (HANDLE)_beginthreadex(
65:                                   NULL,
66:                                   0x4000,
67:                                   (unsigned
(__stdcall *) (void *))(&LoadAppInfoThreadProc),
68:                                   (LPVOID)NULL, 0,
69:                                   &(VR_PROCESS::ms_dwPInfoLookupThreadID));
70:
71:           // kick of the timer thread
72:           bPTimerThread = TRUE;
73:           hPTimerThread =
74:             (HANDLE)_beginthreadex(
75:               NULL,
76:               0x4000,
77:               (unsigned (__stdcall *) (void *))(&PTimerThread),
78:               (LPVOID)CHECKPROCESSDATA, 0,
79:               &dwPTimerThread);
80:
81:    #if BLOCK_WINDOWS_HOOKS
82:         DWORD dwError = 0;
83:
84:         hHookLib = LoadLibrary("vsmsg.dll");
85:
86:         if (!hHookLib)
87:            dwError = GetLastError( );
88:    #endif
89:
90:         // initialize support for parent process checking
91:         // for NT, we use an undocumented ntdll function
to get parent proc
92:         // id for 9x, we use an icky hack to obtain
obfuscator mask to be use on a pid.
93:         if (IsWinNT( ))
94:         {
95:            // for NT: load NtQueryInformationProcess( ) from
               ntdll.dll
96:            hModNtDll = LoadLibrary("ntdll.dll");
97:            NtQueryInformationProcess =
(fptr_NtQueryInformationProcess)GetProcAddress(hModNtDll,
"NtQueryInformationProcess");
98:         }
99:         else
100:        {
101:           // for 9x: get magic obfuscator used to mask
process database given PID
102:           DWORD dwTID = GetCurrentThreadID( );
103:           BOOL bIs95 = IsWin95( );
104:           DWORD pThreadDB;
105:           _asm
106:           {
107:             push eax
108:             push ecx
109:             mov eax, FS:[18h]
110:             mov ecx, bIs95
111:             test ecx, ecx
112:             jz Win98ME
113:             sub eax, 10h      // for Win95
114:             jmp End
115:           Win98ME:
116:             sub eax, 08 h     // for Win98/ME
117:           End:
118:             mov pThreadDB, eax
119:             pop ecx
120:             pop eax
```

-continued

```
121:            }
122:            dwObfuscator9x = dwTID ^ pThreadDB;
123:        }
124:    }
```

As previously described, when a new process is created, the system and method of the present invention provides for the creation of a "VR_PROCESS" object to model the newly created process. The above "InitVRProcess" function initializes the "VR_PROCESS" object. In particular, certain operating system elements are tracked (for Windows 95/98/ME environments) and are automatically approved as "trusted parent" processes as shown at lines 23–53. As shown above at lines 93–97, if the operating system is Windows NT/2000/XP/2003, the function address of "NtQueryInformationProcess" is obtained to provide a mechanism for obtaining parent process IDs of a process. Lines 99–123 illustrate a different process using assembly code to obtain an obfuscator providing access to parent process information on Windows 95/98/ME environments.

Collecting process information

After a VR_Process object is initialized, a call is made to the following "VR_PROCESS::LoadInfo" method to gather information about the newly created process:

```
1:      BOOL WINAPI VR_PROCESS::LoadInfo(PVR_PROCESS pOrigEventProc)
2:      {
3:          if( !pOrigEventProc )
4:          {
5:              //then this is the childmostprocess
6:              pOrigEventProc = this;
7:          }
8:          if (!bInfoLoaded)
9:          {
10:             hProcess =    OpenProcess(PROCESS_QUERY_INFORMATION |
PROCESS_VM_READ,
11:                           FALSE, dwProcessID);
12:
13:             DWORD lastError;
14:             if (hProcess == NULL)        // error opening process
15:                 lastError = GetLastError( );
16:             if ((hProcess == NULL) && IsWinNT( ))
17:             {
18:                 // Try to use Ashu's IOCTL to open the process
19:                 HANDLE       hDevice;
20:                 DWORD        dwBytesReturned;
21:                 OPEN_PARAMS         OpenParams;
22:
23:                 hDevice = CreateFile("\\\\.\\vsdatant",
24:                         GENERIC_READ | GENERIC_WRITE,
25:                         0,
26:                         NULL,
27:                         OPEN_EXISTING,
28:                         FILE_ATTRIBUTE_NORMAL,
29:                         NULL
30:                         );
31:
32:                 OpenParams.dwProcessID = dwProcessID;
33:                 OpenParams.DesiredAccess = PROCESS_QUERY_
INFORMATION | PROCESS_VM_READ;
34:
35:                 DeviceIoControl(     hDevice,
36:                         DIOC_OPENPROCESS,
37:                         &OpenParams,
38:                         sizeof(OPEN_PARAMS),
39:                         &hProcess,
40:                         sizeof(DWORD),
41:                         &dwBytesReturned,
42:                         NULL);
43:             }
44:
45:             if (hProcess == NULL && pOrigEventProc == this)//filter out failure if PPP event
46:             {
47:                 char buf[1025] = {0};
48:
49:     #ifdef _DEBUG
50:                 // get the windows error string.
51:                 char pszError[256] = { 0 };
52:                 FormatMessage( FORMAT_MESSAGE_FROM_SYSTEM, NULL,
lastError, 0, pszError, sizeof(pszError), NULL );
```

-continued

```
53:            int nErrorLen = lstrlen( pszError );
54:            pszError[nErrorLen-1] = 0;
55:            wsprintf( buf, "OpenProcessError %d %s: on process ID %d,
named %s", lastError, pszError, dwProcessID, cCmdLine );
56:        #else
57:            wsprintf( buf, "OpenProcessError %d: on process ID %d,
named %s", lastError, dwProcessID, cCmdLine );
58:        #endif
59:            VSReportEvent( buf );
60:        }
61:
62:        if (IsWinNT( ))
63:            pCurrentUser = OpenUserByIDs(dwProcessID, 0, 0, this);
64:        else
65:            pCurrentUser = OpenUser (NULL, 0);
66:
67:        if (pCurrentUser && pSession)
68:            pSession->LogAddUser(pCurrentUser, TRUE);
69:
70:            // this gets the command and the full path from the os
71:        GetFileInfo( );
72:
73:        ////////////////////////////////////////////////////////////
74:        if ( IsWinNT( ) && !hProcess )
75:        { // Only do this in nt and if we failed to get the
process handle.
76:            VSPathRemoveArgs( cPath, sizeof(cPath), cCmdLine );
77:        }
78:        ////////////////////////////////////////////////////////////
79:
80:        GetShellInfo( );
81:            //version includes all the apps properties
82:        GetVersionInfo( );
83:
84:        if (cCmdLine[0])
85:        {
86:            CHAR cShellName[MAXNAMELEN + 1] = " ";
87:
88:            MapShellInfo(
89:                cCmdLine,
90:                cShellName,
91:                MAXNAMELEN,
92:                NULL, 0, NULL);   //LPSTR iconPath, UINT
cbIconPath, int *piIcon
93:
94:            if (cShellName[0])
95:                lstrcpy (cName, cShellName);
96:
97:        }
98:        }
99:    #ifdef PARENT_PROCESS_CHECK
100:            //now if applicable push ourself onto the vector of the
childs parent processes
101:        BOOL bExcludedParent = IsExcludedParentProc( );
102:        if( pOrigEventProc != this && !bExcludedParent )
103:        {
104:            pOrigEventProc->m_Parents.push_back( this );
105:        }
106:        BOOL bIsWinNTExplorer = FALSE;
107:        if( IsWinNT( ) )
108:        {
109:            if( 0 == strcmpi ("explorer.exe", cFile) )
110:            {
111:                bIsWinNTExplorer = TRUE;
112:            }
113:        }
114:        if( !bExcludedParent && !bIsWinNTExplorer ) //
if this is an excluded parent PROC, then stop the recursion
115:        {
116:            // this gets the parents process id(it is very quick)
117:            GetParentPID( );
118:            if( dwParentProcessID )
119:            {
120:                PVR_PROCESS pParentProc = OpenVRProcess(
dwParentProcessID );
121:                if( pParentProc->dwProcessID )
122:                {
123:                    pParentProc->LoadInfo( pOrigEventProc );
//now recursively load the parent's info
```

```
                                  -continued
124:              }
125:
126:           }
127:        }
128:     #endif //PARENT_PROCESS_CHECK
129:         // go ahead & close the process handle now - we don't
need it any more
130:         // (see also ProcessHandleMsg)
131:        if (hProcess)
132:        {
133:           HANDLE hProcTmp = hProcess;
134:           hProcess = NULL;
135:           CloseHandle(hProcTmp);
136:        }
137:        bInfoLoaded = TRUE;
138:        return bInfoLoaded;
139:     }
140:
141:
142:     BOOL WINAPI VR_PROCESS::GetParentPID(VOID)
143:     //
144:     // Retrieves parent process ID
145:     //
146:     // return          success
147:     {
148:        BOOL ret = TRUE;
149:        if (IsWinNT( ))
150:        {
151:           // For NT: call ntdll's NtQueryInformationProcess( )
152:           if (NtQueryInformationProcess && hProcess)
153:           {
154:               PROCESS_BASIC_INFORMATION pbi;
155:               memset(&pbi, 0, sizeof(pbi));
156:               ULONG ulRetLen;
157:               ret = NtQueryInformationProcess (hProcess,
ProcessBasicInformation,
158:                    (void*) &pbi, sizeof(PROCESS_BASIC_INFORMATION),
&ulRetLen);
159:            if (!ret)
160:               dwParentProcessID = pbi.InheritedFromUniqueProcessId;
161:            else
162:               dwParentProcessID = 0;
163:           }
164:        }
165:        else
166:        {
167:           // For 9x: Use obfuscator to obtain process database
pointer from pid
168:           PPROCESS_DATABASE pdb = (PPROCESS_DATABASE)
(dwProcessID ^ dwObfuscator9x);
169:           if( pdb )
170:           {
171:               dwParentProcessID = (DWORD) (pdb->pParentPDB) ^
dwObfuscator9x;
172:           }
173:        }
174:        return ret;
175:     }
```

As shown commencing at line 99 above ("#ifdef PARENT_PROCESS_CHECK"), the parent process ID is obtained using the information collected during initialization. In particular, a call to "GetParentPID" at line 117 obtains the process ID of the parent of the current process. The "GetParentPID" function itself is illustrated at lines 142–175 and is described below. If the parent process ID is located, a call to "OpenVRProcess" at line 120 extracts another "VR_Process" based upon the process ID. Once this information is obtained (i.e., a valid pointer to a parent process is obtained), "LoadInfo" is called on the parent process as shown at line 123 to gather information on the parent process. The method operates in a pseudo-recursive fashion to obtain information on all parent processes in the process chain until all processes in the chain have been enumerated.

The "GetParentPID" function commencing at line 142 above is the function that actually retrieves the parent process ID. As shown at line 149, if the operating environment is Windows NT/2000/XP/2003, the "NtQueryInformationProcess" API function is called as illustrated at line 157. Otherwise, for Windows 95/98/ME operating environments, the parent process ID is retrieved by a bitwise manipulation using the obfuscator as shown at line 171 above. The foregoing steps serve to gather the required information and lay the foundation for controlling indirect access. The operations in response to a particular attempt to access the network will now be described.

Attempt to access network triggers parent check

The following "TriggerEvent" function is called when an application uses a Windows socket (Winsock) call to attempt to access the network.

```
 1:     DWORD VR_PROCESS::TriggerEvent(
 2:         DWORD dwEventMsg,        // Message #
 3:         PVR_BASE pBase,          // Object that actually triggered the event
 4:         PVSMSG pMsg,             // vsdata Message that triggered the event
 5:         LPVOID pData,            // Additional data (based on message) -
(created within the WSockHandleMsg call)
 6:         DWORD dwDataLen,         // Lengths (of additional data)
 7:         VR_PROCESS* pProcRoot)   // Root process (used when
checking parent proc chain)
 8:     {
 9:         DWORD              dwEventResult         = dwEventError;
10:         VR_PROCESS         *pParent              = NULL;
11:         DWORD              dwParentEventResult   = MSGEVT_RETURN_NOOP;
12:         VR_PROCESS         *pUpperProc           = pProcRoot?pProcRoot:this;
13:
14:         ///////////////////////////////////////////////////////////////
15:         // set up the message information structure
16:         PMSGEVT_INFO pMEInfo = NULL;
17:         switch (dwEventMsg)
18:         {
19:             case MSGEVT_SITE_CONNECT:
20:             case MSGEVT_PROCESS_DATA:
21:             case MSGEVT_PROCESS_LISTEN:
22:             case MSGEVT_SITE_ACCEPT:
23:                 if (pData && (dwDataLen == sizeof(MSGEVT_INFO)))
24:                 {//note: all of the other stuff was set was set up before
this call
25:                     pMEInfo = (PMSGEVT_INFO) pData;
26:                     pMEInfo->dwModCount = 0;
27:                     pMEInfo->lpdwModList = NULL;
28:                 }
29:                 break;
30:             default: // in the event of a resubmit, everything already
known about the process is still known
31:                 break;
32:         }
33:         // done setting up the message information structure
34:         ///////////////////////////////////////////////////////////////
35:
36:
37:     #ifdef PARENT_PROCESS_CHECK
38:         ///////////// PPP protection resubmit event/////////////////
39:         // this tells the rules engine to remember what the answer
was to the parent proc
40:         if( m_ResubmitByParentProc                          &&
41:             pPendingMsg == (PVSMSG_STREAM)pMsg              &&
42:             dwPendingEventMsg == dwEventMsg                 &&
43:             !pProcRoot                                      && //(this is the child)
44:             pMEInfo                                         &&
45:             m_LastParentChecked                                )
46:         {
47:             m_ResubmitByParentProc = FALSE;
48:             dwPendingClient = NULL;
49:             //find the parent that responded( the top one in the list
that does not have bWasChecked set )
50:             VR_PROCESS *pParentThatCausedThis =
                    m_LastParentChecked;
51:
52:             // if this event was resubmitted as a result of a parent
process protection request,
53:
54:             // then tell the db what the result was
55:             dwEventMsg |= MSGEVT RESUBMIT;
56:             pMEInfo->dwChildProcId = dwID; //note:this tells the
rule engine that this is a ppp event
57:             pMEInfo->dwResult = dwPendingEventResult; //the
result is the one that was returned by the client (ZA)
58:
59:             dwParentEventResult = MonitorNotifyEvent(
60:                     dwEventMsg, pParentThatCausedThis->
dwID, pBase ? pBase->dwID : 0, //dwID is the process id
61:                     pParentThatCausedThis->dwAnchor,
pData, dwDataLen);
62:
63:             dwEventMsg &= ~MSGEVT_RESUBMIT; //turn off the
resubmit flag
64:             pPendingMsg = NULL;
65:             dwPendingEventMsg = 0;
66:
```

-continued

```
 67:             // the answer is NO, so we can stop processing parents,
but we don't have to remember this answer
 68:             if( pParentThatCausedThis                         &&
 69:                 dwPendingEventResult == MSGEVT_RETURN_STOP   )
 70:             {
 71:                 dwParentEventResult = dwPendingEventResult;
 72:                 dwEventResult = dwParentEventResult;
 73:             }
 74:             pMEInfo->dwResult = 0;
 75:         }// END this tells the rules engine to remember what the
answer was to the parent proc
 76:
 77:         /////////////// PPP protection trigger parent event////////////
 78:         DWORD dwAppSecLevel = MonitorGetDWordValue ( 0,
GDV_APP_SECLEV );
 79:         DWORD dwPPPDisabled = MonitorGetDWordValue ( 0,
GDV_DISABLE_PPP );
 80:         // if this was a process directly asking for permission,
first check its parents permissions
 81:         if( (ASL_HIGH == dwAppSecLevel && !dwPPPDisabled ) &&
//if this is globally enabled
 82:             dwParentEventResult != MSGEVT_RETURN_STOP   &&
//if a pending parent didn't already say STOP
 83:             !pProcRoot && !m_Parents.empty()         &&
 84:             pMEInfo                                                )
 85:         {
 86:             // iterate through the parents(in reverse)
 87:             for ( int i = m_Parents.size() - 1; i >= 0; i-- )
 88:             {
 89:                 PVR_PROCESS pPar = m_Parents[i];
 90:                 //trigger that parent proc's event
 91:                 pMEInfo->dwChildProcId = dwID;
 92:                 dwParentEventResult = pPar->TriggerEvent( dwEventMsg,
 93:                                                     pBase, pMsg,
pData, dwDataLen, pUpperProc );
 94:                 //check the return
 95:                 if( dwParentEventResult == MSGEVT_RETURN_OK )
 96:                 {
 97:                     // continue to the next parent
 98:                 }
 99:                 else if( dwParentEventResult == MSGEVT_RETURN_STOP )
100:                 {
101:                     dwEventResult = dwParentEventResult; // this
tells the child to stop
102:                     break;
103:                 }
104:                 else if( dwParentEventResult ==
MSGEVT_RETURN_PENDING )
105:                 {
106:                     m_LastParentChecked = pPar; //remember which
parent triggered this
107:                     m_ResubmitByParentProc = TRUE;
108:                     dwEventResult = dwParentEventResult; // this
tells the child to return pending
109:                     dwPendingEventMsg = 0; //clear this for now
110:                     m_bResubmitByVsmon = FALSE;
111:                     // all of the pending information will get
saved below
112:                     break; //break out of the loop
113:                 }
114:             }//end for loop
115:             pMEInfo->dwChildProcId = 0; //reset the child
procID, since we are now dealing with the child directly
116:         }//end checking for PPP
117:     #endif // PARENT_PROCESS_CHECK
118:
119:         //make sure that all the modules have been cleared
for security
120:         if (!pProcRoot && //this is a child (we don't do module
protection for PPP)
121:             (MSGEVT_RETURN_STOP    != dwEventResult) && //(if
the parent hasn't already decided
122:             (MSGEVT_RETURN_PENDING  != dwEventResult) &&
123:             pMEInfo && dwModuleCount && !bModsChecked )//&&
!dwEventResult)
124:         {
125:             pMEInfo->lpdwModList = (LPDWORD) malloc(dwModuleCount *
sizeof(DWORD));
126:         if (pMEInfo->lpdwModList)
```

```
127:        {
128:            DWORD i = 0;
129:            PVR_MODULE_REF pModRef = pModuleRef;
130:            while (pModRef)
131:            {
132:              if (pModRef->pModule)
133:              {
134:                pMEInfo->lpdwModList[i] = pModRef->pModule->dwID;
135:                i++;
136:              }
137:              pModRef = (PVR_MODULE_REF) pModRef->pNext;
138:            }
139:            pMEInfo->dwModCount = i; //NOTE: this count is always one less than the
140:                                            //dwModuleCount, because the first module open
141:                            //is really the process itself getting
                                                opened
142:        }
143:      }
144:
145:        // if this message is a result of a resubmitted message...
146:      if( (pPendingMsg == (PVSMSG_STREAM)pMsg) &&
147:          (dwPendingEventMsg == dwEventMsg)         )
148:      {
149:    #ifdef _PENDING_DEBUG
150:          wsprintf(cPDMsg, "TriggerEvent-RESUBMIT(id=%lx pid=%lu p=%lx): pMsg=%lx=>0 evtMsg=%lx=>0 cli=%lx=>0 res=%lx=>0\n",
151:              dwID, dwProcessID, this, pMsg, dwEventMsg, dwPendingClient, dwPendingEventResult);
152:          OutputDebugString(cPDMsg);
153:    #endif //_PENDING_DEBUG
154:            if (!m_bResubmitByVsmon) //if this was resubmited by the rules engine (to ask the GUI)
155:            {
156:              dwEventMsg |= MSGEVT_RESUBMIT;
157:              if (pMEInfo)
158:              {
159:                pMEInfo->dwResult = dwPendingEventResult; //the result is the one that was returned by the client (ZA)
160:              }
161:            }
162:            else //else vsmon resubmitted, so it could look up the processes info
163:            {
164:                m_bResubmitByVsmon = FALSE;
165:            }
166:
167:          pPendingMsg = NULL;
168:          dwPendingClient = NULL;
169:          dwPendingEventMsg = 0;
170:          dwPendingEventResult = 0;
171:          pPendingMod = NULL;
172:      }
173:
174:        // *** ASK THE RULES ENGINE IF THIS APP HAS PERMISSION ***
175:        // if we have decided a result yet (as a result of a pending PPP or a direct PPP "NO"),
176:        // then submit the question to the rest of the rules engine...this might have to ask the GUI clients
177:      if( (MSGEVT_RETURN_STOP    != dwEventResult ) &&
178:          (MSGEVT_RETURN_PENDING != dwEventResult)   )
179:      { // this looks in the db to see what to do
180:          dwEventResult =
181:            MonitorNotifyEvent(
182:              dwEventMsg, dwID, pBase ? pBase->dwID : 0, //dwID is the process id
183:              dwAnchor, pData, dwDataLen);
184:      }
185:
186:
187:        // if we checked for modules...
188:      if (pMEInfo && pMEInfo->lpdwModList)
189:      {
190:          free (pMEInfo->lpdwModList);
191:              pMEInfo->lpdwModList = NULL;
192:          if ((dwEventResult & MSGEVT_MASK_RETURN) != MSGEVT_RETURN_PENDING)
193:            {
```

-continued

```
194:            bModsChecked = TRUE;
195:          }
196:        }
197:
198:        // NOW.. fill in the appropriate process information
and message information according to
199:        // how we are going to handle this particular process
and message stream(WSock message)
200:        if (pMsg)
201:        {
202:          switch (dwEventResult & MSGEVT_MASK_RETURN)
203:          {
204:            case MSGEVT_RETURN_DELAY:
205:              pMsg->dwDelay = dwEventResult & 0x0000ffff;
206:              break;
207:
208:            case MSGEVT_RETURN_PATCH:
209:              pMsg->dwMsgFlags |= MFR_PATCHED_DATA;
210:              break;
211:
212:            case MSGEVT_RETURN_PENDING:
213:      #ifdef _PENDING_DEBUG
214:              wsprintf(cPDMsg, "TriggerEvent-
PENDING(id=%lx pid=%lu p=%lx): ", dwID, dwProcessID, this);
215:              OutputDebugString(cPDMsg);
216:      #endif
217:              if (!dwPendingEventMsg) // Should always be the case
218:              {
219:      #ifdef _PENDING_DEBUG
220:                wsprintf(cPDMsg, "pMsg=%lx=>%lx
evtMsg=0=>%lx res=%lx=>0\n",
221:                  pPendingMsg, pMsg, dwEventMsg,
dwPendingEventResult);
222:                OutputDebugString(cPDMsg);
223:      #endif
224:                pMsg->dwMsgFlags |= MFR_PENDING;
225:                        //THIS IS NECESSARY WITH OR WITHOUT
PARENT PROCESS PROTECTION
226:                        //if this wasn't an asynchronous msg due
to parent process protection
227:                if( !pProcRoot )
228:                {
229:                  pPendingMsg = (PVSMSG_STREAM) pMsg;
230:                  dwPendingEventMsg = dwEventMsg;
231:                }
232:
233:                dwPendingEventResult = 0;
234:                break;
235:              }
236:      #ifdef _PENDING_DEBUG
237:              wsprintf(cPDMsg, "pMsg=%lx (%lx) evtMsg=%lx (%lx)
cli=%lx res=%lx (STOP)\n",
238:                pPendingMsg, pMsg, dwPendingEventMsg,
dwEventMsg, dwPendingClient, dwPendingEventResult);
239:              OutputDebugString(cPDMsg);
240:      #endif
241:              dwEventResult = MSGEVT_RETURN_STOP; //note: that this
just says to stop processing this message via WSockHandleMessage for now
242:              // fall through NOT to stop this traffic,
or all the traffic
243:            case MSGEVT_RETURN_STOP:
244:      //      pMsg->dwMsgFlags |= MFR_DECLINE;
245:              pMsg->dwResult = dwEventResult & (~MSGEVT_MASK_RETURN);
246:
247:              if ( (dwEventResult & MSGEVT_RETURN_STOPALL) ==
MSGEVT_RETURN_STOPALL)
248:              {
249:                dwEventError = dwEventResult; //Make it permanent
250:              }
251:          }
252:        }
253:        return (dwEventResult);
254:      }
```

When a message is received that indicates an application is attempting to access the network, the above "TriggerEvent" function is called. The function parameters include an event-specific message and, of particular interest to the present invention at line 7 above, a pointer to a "VR_PROCESS" object ("VR_PROCESS* pProcRoot"). As previously described, the examination of the process chain initially starts with the application that is directly accessing the network. As the examination process proceeds backwards in the process chain, this pointer to the root process (the process directly accessing the network) is passed as each parent process is checked. As illustrated above, every parent process (application) is checked to see that it has permission to be a parent before the application itself is checked to see if it has permission to access the network.

The "#ifdef PARENT_PROCESS_CHECK" routine shown commencing at line 37 above is optimization that evaluates whether additional checking is necessary. The code commencing at line 48 and ending at line 84, checks in the rules engine to see if there is already a "no" answer contained in the rules engine (i.e., it is already known that access will not be permitted). This is another optimization that stops examination of parent processes if a parent process that is disallowed (i.e., is not allowed to indirectly access network) is found. As previously described, if any parent process in the chain is disallowed, then network access is blocked in the currently preferred embodiment. Accordingly, if a blocked application is found, there is no need for further examination or for presenting dialogs to the user requesting input as it can already be determined that access will not be permitted based upon permission settings already available in the rules engine.

If an immediate answer cannot be determined as a result of the above process, then the "for" loop commencing at line 87 and ending at line 116 iterates through the parent processes in reverse. At lines 92–93 a "TriggerEvent" function is called to examine each process in the process chain. The same procedure described above (including looking in the rules engine for an answer and so forth) is applied for each parent process. This is a pseudo recursive routine for calling the "TriggerEvent" function repeatedly in order to examine all processes in the process chain. Based upon this examination of parent processes, access to the network may be permitted or denied.

While the invention is described in some detail with specific reference to a single-preferred embodiment and certain alternatives, there is no intent to limit the invention to that particular embodiment or those specific alternatives. Those skilled in the art will appreciate that modifications may be made to the preferred embodiment without departing from the teachings of the present invention. For instance, although the foregoing discussion uses the example of a parent-child process chain to illustrate the operations of the present invention, the methodology of the invention may also be employed in an environment in which the Component Object Model (COM) is used to create interoperable components and applications.

What is claimed is:

1. A method for control of indirect access to a network, the method comprising:
   detecting an attempt to access a network from a first application;
   determining whether at least one other application is attempting indirect network access through said first application;
   if at least one other application is determined to be attempting indirect network access, evaluating whether each said at least one other application is approved for network access;
   if each said at least one other application is approved for network access, permitting access to the network by said first application; and
   otherwise, denying access to the network.

2. The method of claim 1, wherein said detecting step includes trapping requests for network access.

3. The method of claim 1, wherein said determining step includes tracking requests for creation of a new process.

4. The method of claim 3, wherein said tracking step include determining parent processes of the new process.

5. The method of claim 4, wherein determining parent processes includes collecting information about said parent processes.

6. The method of claim 1, wherein said determining step includes tracking launching of an application by another application.

7. The method of claim 6, wherein launching of an application includes launching as a Component Object Model (COM) server.

8. The method of claim 6, wherein said tracking step includes collecting information about Component Object Model (COM) client-server relationships.

9. The method of claim 1, wherein said evaluating step includes applying a security policy for determining whether each said at least one other application is approved for network access.

10. The method of claim 9, wherein said security policy specifies which applications are allowed network access.

11. The method of claim 9, wherein said security policy specifies particular types of network access which are allowed.

12. The method of claim 1, wherein said evaluating step includes determining whether each said at least one other application is a trusted application.

13. The method of claim 1, wherein said evaluating step includes obtaining user input as to whether an application should be allowed network access.

14. The method of claim 1, wherein said attempt to access a network comprises an attempt to access the Internet.

15. The method of claim 1, wherein said denying step includes using a "firewall" application for selectively blocking network access.

16. A computer-readable medium having computer-executable instructions for performing the method of claim 1.

17. A downloadable set of computer-executable instructions for performing the method of claim 1.

18. In a computer system, a method for controlling indirect access to a network, said indirect access comprising access by a program to a network through at least one other program, the method comprising:
   in response to launching of a first program by a second program, collecting relationship information about the first program and second program;
   in response to an attempt to access a network by a given program, generating a list of programs indirectly accessing the network through the given program based upon the collected relationship information;
   determining whether each program on said list is trusted under a security policy governing access to the network; and
   if a program on said list is determined not to be trusted, denying access to the network.

19. The method of claim 18, wherein said collecting step includes the substeps of:
   detecting creation of new processes; and
   collecting information about parent-child process relationships.

20. The method of claim 18, wherein said collecting step includes the substeps of:

detecting creation of Component Object Model (COM) client-server relationships; and collecting information about COM client-server relationships.

21. The method of claim 18, wherein said network comprises the Internet.

22. The method of claim 18, wherein said list of programs comprises a parent-child process chain.

23. The method of claim 18, wherein said list of programs comprises a chain of Component Object Model (COM) client-server relationships.

24. The method of claim 18, wherein said determining step includes determining whether each program in said list is known.

25. The method of claim 18, wherein said determining step includes determining whether any program in said list is not trusted.

26. The method of claim 18, wherein said determining step includes asking a user whether to permit access by a given program.

27. The method of claim 18, wherein said security policy includes a list of programs permitted to access the network.

28. The method of claim 18, wherein said security policy includes a list of programs not permitted to access the network.

29. The method of claim 18, wherein said security policy includes enforcement rules governing access to at least one network.

30. A computer-readable medium having computer-executable instructions for performing the method of claim 18.

31. A downloadable set of computer-executable instructions for performing the method of claim 18.

32. A system for regulating indirect access to resources, the system comprising:

a security policy governing access to resources;

a driver module for detecting creation of a new process and invoking a supervisor module;

a supervisor module for identifying all parent processes of the newly created process; and an enforcement module for determining whether to permit access to resources based, at least in part, upon the identified parent processes and the security policy governing access to resources.

33. The system of claim 32, wherein creation of a new process includes a first application launching a second application as a Component Object Model (COM) server.

34. The system of claim 32, wherein said driver module detects launching of an application by another application.

35. The system of claim 32, wherein identifying parent process by said supervisor module includes identifying Component Object Model (COM) client-server relationships.

36. The system of claim 32, wherein said enforcement module determines whether each identified parent process is approved for access to the resources under the security policy.

37. The system of claim 32, wherein said security policy specifies particular applications which are allowed to access the resources.

38. The system of claim 32, wherein said security policy specifies particular applications which are not allowed to access the resources.

39. The system of claim 32, wherein said security policy specifies which particular resources which may be accessed.

40. The system of claim 32, wherein said enforcement module obtains user input as to whether to allow access to the resources.

41. The system of claim 32, wherein the resources include a network.

42. The system of claim 32, further comprising:

a firewall module for selectively blocking access to the resources.

* * * * *